(12) United States Patent
Brisebois et al.

(10) Patent No.: US 9,641,555 B1
(45) Date of Patent: May 2, 2017

(54) SYSTEMS AND METHODS OF TRACKING CONTENT-EXPOSURE EVENTS

(71) Applicant: Dell Software Inc., Aliso Viejo, CA (US)

(72) Inventors: Michel Albert Brisebois, Renfrew (CA); Curtis T. Johnstone, Ottawa (CA)

(73) Assignee: Dell Software Inc., Aliso Viejo, CA (US)

( * ) Notice: Subject to any disclaimer, the term of this patent is extended or adjusted under 35 U.S.C. 154(b) by 0 days.

(21) Appl. No.: 14/683,465

(22) Filed: Apr. 10, 2015

(51) Int. Cl.
*G06F 21/60* (2013.01)
*H04L 29/06* (2006.01)

(52) U.S. Cl.
CPC ............. *H04L 63/30* (2013.01); *G06F 21/60* (2013.01)

(58) Field of Classification Search
CPC .................................................. G06F 21/60
See application file for complete search history.

(56) References Cited

U.S. PATENT DOCUMENTS

| | | | |
|---|---|---|---|
| 5,675,711 A | 10/1997 | Kephart et al. | |
| 6,009,439 A | 12/1999 | Shiomi et al. | |
| 6,012,087 A * | 1/2000 | Freivald | G06F 17/3089 707/E17.116 |
| 6,092,059 A | 7/2000 | Straforini et al. | |
| 6,266,656 B1 | 7/2001 | Ohno | |
| 6,310,944 B1 | 10/2001 | Brisebois et al. | |
| 6,345,327 B1 | 2/2002 | Baskey et al. | |
| 6,415,282 B1 | 7/2002 | Mukherjea et al. | |
| 6,421,676 B1 | 7/2002 | Krishnamurthy et al. | |
| 6,633,835 B1 | 10/2003 | Moran et al. | |

(Continued)

FOREIGN PATENT DOCUMENTS

| | | |
|---|---|---|
| WO | WO-2011/103385 A1 | 8/2011 |
| WO | WO-2013/166126 A1 | 11/2013 |

(Continued)

OTHER PUBLICATIONS

Proofpoint, Inc.; "Proofpoint Introduces Its Next-Generation Email Security and Privacy Platform with Enhanced Email Encryption, Available for SaaS and Appliance Deployment"; http://investors.proofpoint.com/releasedetail.cfm?releaseid=664064; Oct. 5, 2009; 5 pages.

(Continued)

*Primary Examiner* — William Powers
(74) *Attorney, Agent, or Firm* — Winstead PC

(57) ABSTRACT

In one embodiment, a method includes identifying a user-initiated precursor of an anticipated exposure event. The method also includes, in response to the identifying, automatically determining particular content that would be exposed if the exposure event were to occur. In addition, the method includes automatically determining one or more users to which the particular content would be exposed if the exposure event were to occur. Further, the method includes, before the exposure event occurs, publishing a result of the automatically determining to a user associated with the user-initiated precursor. Also, the method includes, in response to a detected occurrence of the exposure event, monitoring a plurality of communications platforms for follow-on exposure events in relation to the particular content which chain from the exposure event.

20 Claims, 18 Drawing Sheets

(56) References Cited

U.S. PATENT DOCUMENTS

| | | | |
|---|---|---|---|
| 6,647,396 B2 | 11/2003 | Parnell et al. | |
| 6,735,701 B1 | 5/2004 | Jacobson | |
| 6,883,019 B1 | 4/2005 | Sengupta et al. | |
| 7,047,236 B2 | 5/2006 | Conroy et al. | |
| 7,058,621 B1 | 6/2006 | Wolge | |
| 7,318,040 B2 | 1/2008 | Doss et al. | |
| 7,363,278 B2 | 4/2008 | Schmelzer et al. | |
| 7,516,492 B1 | 4/2009 | Nisbet et al. | |
| 7,730,537 B2 | 6/2010 | Bardsley et al. | |
| 7,760,684 B2 | 7/2010 | Kadar et al. | |
| 7,769,751 B1 | 8/2010 | Wu et al. | |
| 7,809,856 B2 | 10/2010 | Skarpness | |
| 7,886,359 B2 | 2/2011 | Jones et al. | |
| 7,908,647 B1 | 3/2011 | Polis et al. | |
| 7,996,373 B1 | 8/2011 | Zoppas et al. | |
| 7,996,374 B1 | 8/2011 | Jones et al. | |
| 7,996,670 B1 | 8/2011 | Krishna et al. | |
| 8,010,466 B2 | 8/2011 | Patinkin | |
| 8,065,739 B1 | 11/2011 | Bruening et al. | |
| 8,086,538 B2 | 12/2011 | D'Alo' et al. | |
| 8,132,250 B2 | 3/2012 | Judge et al. | |
| 8,141,127 B1* | 3/2012 | Mustafa | G06F 17/30943 726/1 |
| 8,156,553 B1 | 4/2012 | Church et al. | |
| 8,224,924 B2 | 7/2012 | Andersen et al. | |
| 8,255,370 B1 | 8/2012 | Zoppas et al. | |
| 8,255,419 B2 | 8/2012 | Grebenik et al. | |
| 8,286,254 B2 | 10/2012 | Kraemer et al. | |
| 8,341,734 B1 | 12/2012 | Hernacki et al. | |
| 8,346,929 B1 | 1/2013 | Lai | |
| 8,359,472 B1 | 1/2013 | Ren et al. | |
| 8,407,194 B1 | 3/2013 | Chaput et al. | |
| 8,429,260 B2 | 4/2013 | Siegel et al. | |
| 8,549,643 B1 | 10/2013 | Shou | |
| 8,620,922 B2 | 12/2013 | Bird et al. | |
| 8,649,499 B1 | 2/2014 | Koster et al. | |
| 8,671,190 B2 | 3/2014 | Liyanage et al. | |
| 8,677,448 B1 | 3/2014 | Kauffman et al. | |
| 8,706,692 B1* | 4/2014 | Luthra | G06F 17/30575 707/622 |
| 8,745,091 B2 | 6/2014 | McHenry et al. | |
| 8,756,087 B1 | 6/2014 | Ambikar | |
| 8,763,140 B2 | 6/2014 | Marcus et al. | |
| 8,769,073 B2 | 7/2014 | Humphreys et al. | |
| 8,839,350 B1 | 9/2014 | McNair et al. | |
| 8,863,272 B1 | 10/2014 | Maeng | |
| 8,943,575 B2 | 1/2015 | Kumar et al. | |
| 9,015,832 B1 | 4/2015 | Lachwani et al. | |
| 9,111,069 B1 | 8/2015 | Torney et al. | |
| 9,183,384 B1 | 11/2015 | Bruhmuller | |
| 9,202,063 B1 | 12/2015 | Ekke et al. | |
| 9,213,847 B2 | 12/2015 | Farkash et al. | |
| 9,300,693 B1 | 3/2016 | Manmohan et al. | |
| 9,349,016 B1 | 5/2016 | Brisebois et al. | |
| 9,390,240 B1 | 7/2016 | Brisebois et al. | |
| 2001/0015817 A1 | 8/2001 | Adachi | |
| 2002/0083063 A1 | 6/2002 | Egolf | |
| 2002/0087682 A1 | 7/2002 | Roach | |
| 2002/0091811 A1 | 7/2002 | Schweitzer et al. | |
| 2002/0143595 A1 | 10/2002 | Frank et al. | |
| 2002/0162031 A1 | 10/2002 | Levin et al. | |
| 2002/0169679 A1 | 11/2002 | Neumayer | |
| 2003/0028525 A1 | 2/2003 | Santos et al. | |
| 2003/0207685 A1 | 11/2003 | Rankin | |
| 2003/0226035 A1 | 12/2003 | Robert et al. | |
| 2004/0034659 A1 | 2/2004 | Steger | |
| 2004/0044482 A1 | 3/2004 | Takeda et al. | |
| 2004/0048232 A1 | 3/2004 | Murphy et al. | |
| 2004/0083389 A1* | 4/2004 | Yoshida | G06F 11/3495 726/22 |
| 2004/0199491 A1 | 10/2004 | Bhatt | |
| 2004/0205661 A1 | 10/2004 | Gallemore | |
| 2005/0060295 A1 | 3/2005 | Gould et al. | |
| 2005/0097320 A1 | 5/2005 | Golan et al. | |
| 2005/0226495 A1 | 10/2005 | Li | |
| 2005/0240754 A1 | 10/2005 | Auterinen | |
| 2005/0251675 A1* | 11/2005 | Marcjan | G06F 21/6218 713/100 |
| 2005/0262061 A1 | 11/2005 | Moritsu et al. | |
| 2006/0013456 A1 | 1/2006 | Soykan | |
| 2006/0019397 A1 | 1/2006 | Soykan | |
| 2006/0031465 A1 | 2/2006 | Ahya et al. | |
| 2006/0069686 A1 | 3/2006 | Beyda et al. | |
| 2006/0167696 A1* | 7/2006 | Chaar | G10L 15/22 704/270 |
| 2006/0178910 A1 | 8/2006 | Eisenberger et al. | |
| 2006/0218110 A1 | 9/2006 | Simske et al. | |
| 2006/0218134 A1 | 9/2006 | Simske et al. | |
| 2006/0224994 A1* | 10/2006 | Cheemalapati | G06F 3/0481 715/808 |
| 2006/0259333 A1 | 11/2006 | Pyburn et al. | |
| 2007/0014537 A1 | 1/2007 | Wesemann et al. | |
| 2007/0050854 A1 | 3/2007 | Cooperstein et al. | |
| 2007/0100812 A1 | 5/2007 | Simske et al. | |
| 2007/0143851 A1 | 6/2007 | Nicodemus et al. | |
| 2007/0180509 A1* | 8/2007 | Swartz | G06F 9/4406 726/9 |
| 2007/0219964 A1 | 9/2007 | Cannon et al. | |
| 2007/0282908 A1 | 12/2007 | Van der Meulen et al. | |
| 2008/0022370 A1 | 1/2008 | Beedubail et al. | |
| 2008/0026768 A1 | 1/2008 | Fok et al. | |
| 2008/0028453 A1 | 1/2008 | Nguyen et al. | |
| 2008/0083021 A1 | 4/2008 | Doane et al. | |
| 2008/0184366 A1 | 7/2008 | Alperovitch et al. | |
| 2008/0208475 A1 | 8/2008 | Karr et al. | |
| 2008/0222111 A1 | 9/2008 | Hoang et al. | |
| 2008/0250054 A1 | 10/2008 | Nickel | |
| 2008/0254774 A1 | 10/2008 | Lee | |
| 2009/0019065 A1 | 1/2009 | Sapounas | |
| 2009/0086252 A1 | 4/2009 | Zucker et al. | |
| 2009/0106836 A1 | 4/2009 | Toshima et al. | |
| 2009/0177529 A1 | 7/2009 | Hadi | |
| 2009/0182820 A1* | 7/2009 | Hamilton, II | G06Q 10/107 709/206 |
| 2009/0192853 A1 | 7/2009 | Drake et al. | |
| 2009/0254971 A1 | 10/2009 | Herz et al. | |
| 2009/0258636 A1 | 10/2009 | Helvick | |
| 2009/0265655 A1* | 10/2009 | Fiedler | G06F 17/2785 715/780 |
| 2009/0276346 A1 | 11/2009 | Rukonic et al. | |
| 2009/0279346 A1 | 11/2009 | Manohar et al. | |
| 2009/0292548 A1 | 11/2009 | Van Court | |
| 2010/0036779 A1 | 2/2010 | Sadeh-Koniecpol et al. | |
| 2010/0042448 A1* | 2/2010 | Bess | G06Q 10/10 705/7.39 |
| 2010/0066822 A1 | 3/2010 | Steinberg et al. | |
| 2010/0070461 A1 | 3/2010 | Vella et al. | |
| 2010/0125911 A1 | 5/2010 | Bhaskaran | |
| 2010/0131356 A1 | 5/2010 | Stevens et al. | |
| 2010/0132041 A1* | 5/2010 | Chu | H04L 63/30 726/24 |
| 2010/0162347 A1 | 6/2010 | Barile | |
| 2010/0174813 A1 | 7/2010 | Hildreth et al. | |
| 2010/0199287 A1 | 8/2010 | Boda et al. | |
| 2010/0235915 A1 | 9/2010 | Memon et al. | |
| 2010/0250498 A1 | 9/2010 | Andersen et al. | |
| 2010/0273447 A1 | 10/2010 | Mann et al. | |
| 2010/0284290 A1 | 11/2010 | Williams | |
| 2010/0293543 A1 | 11/2010 | Erhart et al. | |
| 2010/0306850 A1 | 12/2010 | Barile et al. | |
| 2011/0016534 A1 | 1/2011 | Jakobsson et al. | |
| 2011/0055923 A1 | 3/2011 | Thomas | |
| 2011/0093293 A1 | 4/2011 | G. N. et al. | |
| 2011/0106797 A1 | 5/2011 | Palakodety et al. | |
| 2011/0119730 A1 | 5/2011 | Eldar et al. | |
| 2011/0209159 A1 | 8/2011 | Baratz et al. | |
| 2011/0213788 A1 | 9/2011 | Zhao et al. | |
| 2011/0225650 A1 | 9/2011 | Margolies et al. | |
| 2011/0270834 A1 | 11/2011 | Sokolan et al. | |
| 2011/0296354 A1 | 12/2011 | Zambetti et al. | |
| 2011/0314558 A1 | 12/2011 | Song et al. | |
| 2012/0041929 A1* | 2/2012 | Kapoor | G06F 17/30073 707/661 |

(56) References Cited

U.S. PATENT DOCUMENTS

| | | | |
|---|---|---|---|
| 2012/0101870 A1 | 4/2012 | Gates et al. | |
| 2012/0109802 A1 | 5/2012 | Griffin et al. | |
| 2012/0110092 A1* | 5/2012 | Keohane | G06Q 10/107 709/206 |
| 2012/0130809 A1 | 5/2012 | Tedjamulia et al. | |
| 2012/0137061 A1 | 5/2012 | Yang et al. | |
| 2012/0137340 A1 | 5/2012 | Jakobsson et al. | |
| 2012/0150773 A1 | 6/2012 | DiCorpo et al. | |
| 2012/0158846 A1 | 6/2012 | Linder | |
| 2012/0167170 A1 | 6/2012 | Shi et al. | |
| 2012/0180120 A1 | 7/2012 | Jain | |
| 2012/0203733 A1 | 8/2012 | Zhang | |
| 2012/0204260 A1 | 8/2012 | Cecil et al. | |
| 2012/0215491 A1 | 8/2012 | Theriot et al. | |
| 2012/0240183 A1 | 9/2012 | Sinha | |
| 2012/0272156 A1 | 10/2012 | Kerger et al. | |
| 2012/0290666 A1* | 11/2012 | Fabre | G06Q 10/107 709/206 |
| 2012/0291087 A1 | 11/2012 | Agrawal | |
| 2012/0311696 A1 | 12/2012 | Datsenko et al. | |
| 2012/0324008 A1 | 12/2012 | Werz, III et al. | |
| 2013/0042327 A1 | 2/2013 | Chow | |
| 2013/0057696 A1 | 3/2013 | Felt et al. | |
| 2013/0067351 A1 | 3/2013 | Yokoi et al. | |
| 2013/0086684 A1 | 4/2013 | Mohler | |
| 2013/0097662 A1 | 4/2013 | Pearcy et al. | |
| 2013/0097701 A1 | 4/2013 | Moyle et al. | |
| 2013/0097709 A1 | 4/2013 | Basavapatna et al. | |
| 2013/0102290 A1 | 4/2013 | Akhtar et al. | |
| 2013/0117268 A1 | 5/2013 | Smith et al. | |
| 2013/0130652 A1 | 5/2013 | Deasy et al. | |
| 2013/0132566 A1 | 5/2013 | Olsen et al. | |
| 2013/0198811 A1 | 8/2013 | Yu et al. | |
| 2013/0211876 A1 | 8/2013 | Perler | |
| 2013/0227641 A1 | 8/2013 | White et al. | |
| 2013/0227712 A1 | 8/2013 | Salem et al. | |
| 2013/0254831 A1 | 9/2013 | Roach et al. | |
| 2013/0290067 A1 | 10/2013 | Barton | |
| 2013/0291055 A1 | 10/2013 | Muppidi et al. | |
| 2013/0298192 A1 | 11/2013 | Kumar et al. | |
| 2013/0298230 A1 | 11/2013 | Kumar et al. | |
| 2013/0298242 A1 | 11/2013 | Kumar et al. | |
| 2013/0305357 A1 | 11/2013 | Ayyagari et al. | |
| 2013/0347055 A1 | 12/2013 | Motoyama | |
| 2014/0006244 A1 | 1/2014 | Crowley et al. | |
| 2014/0019443 A1 | 1/2014 | Golshan | |
| 2014/0026179 A1 | 1/2014 | Devarajan et al. | |
| 2014/0026182 A1 | 1/2014 | Pearl et al. | |
| 2014/0040414 A1 | 2/2014 | Ronchi et al. | |
| 2014/0059700 A1 | 2/2014 | Kiriyama et al. | |
| 2014/0068779 A1 | 3/2014 | Tan et al. | |
| 2014/0074579 A1 | 3/2014 | King | |
| 2014/0081643 A1 | 3/2014 | John et al. | |
| 2014/0087711 A1 | 3/2014 | Geyer et al. | |
| 2014/0149888 A1 | 5/2014 | Morris | |
| 2014/0155028 A1 | 6/2014 | Daniela et al. | |
| 2014/0157351 A1 | 6/2014 | Canning et al. | |
| 2014/0165137 A1 | 6/2014 | Balinsky et al. | |
| 2014/0186810 A1 | 7/2014 | Falash et al. | |
| 2014/0189784 A1 | 7/2014 | Marino et al. | |
| 2014/0199663 A1 | 7/2014 | Sadeh-Koniecpol et al. | |
| 2014/0199664 A1 | 7/2014 | Sadeh-Koniecpol et al. | |
| 2014/0236737 A1 | 8/2014 | Rowe | |
| 2014/0245394 A1 | 8/2014 | Abuelsaad et al. | |
| 2014/0259130 A1 | 9/2014 | Li et al. | |
| 2014/0282824 A1 | 9/2014 | Lango et al. | |
| 2014/0317746 A1 | 10/2014 | Hendel et al. | |
| 2014/0344281 A1 | 11/2014 | Rao et al. | |
| 2014/0355749 A1 | 12/2014 | Conway et al. | |
| 2014/0372162 A1 | 12/2014 | Dhara et al. | |
| 2014/0380475 A1 | 12/2014 | Canning et al. | |
| 2015/0039565 A1 | 2/2015 | Lucas | |
| 2015/0074579 A1 | 3/2015 | Gladstone et al. | |
| 2015/0111607 A1 | 4/2015 | Baldwin | |
| 2015/0120763 A1* | 4/2015 | Grue | G06F 17/30386 707/754 |
| 2015/0135263 A1 | 5/2015 | Singla et al. | |
| 2015/0143494 A1 | 5/2015 | Lee et al. | |
| 2015/0163121 A1 | 6/2015 | Mahaffey et al. | |
| 2015/0205595 A1 | 7/2015 | Dudai | |
| 2015/0215329 A1 | 7/2015 | Singla et al. | |
| 2015/0215337 A1 | 7/2015 | Warren | |
| 2015/0269386 A1 | 9/2015 | Khetawat et al. | |
| 2015/0339477 A1 | 11/2015 | Abrams et al. | |
| 2016/0007083 A1 | 1/2016 | Gurha | |
| 2016/0073148 A1 | 3/2016 | Winograd et al. | |

FOREIGN PATENT DOCUMENTS

| | | |
|---|---|---|
| WO | WO-2013180707 A1 | 12/2013 |
| WO | WO-2014021871 A1 | 2/2014 |
| WO | WO-2014080239 A1 | 5/2014 |

OTHER PUBLICATIONS

U.S. Appl. No. 14/875,120, Briseboise et al.
Microsoft; "Network Planning, Monitoring, and Troubleshooting with Lync Server"; http://www.microsoft.com/en-ca/download/details.aspx?id=39084; Jun. 10, 2015; 2 pages.
Microsoft; "Quality of Experience (QoE) database schema in Lync Server 2013"; https://technet.microsoft.com/en-us/library/gg398687.aspx; Oct. 3, 2012; 1 page.
Microsoft; "List of QoE tables in Lync Server 2013"; https://technet.microsoft.com/en-us/library/gg398236.aspx; Oct. 2, 2012; 3 pages.
Microsoft; "AppliedBandwidthSource table in Lync Server 2013"; https://technet.microsoft.com/en-us/library/gg425725.aspx; Oct. 2, 2012; 1 page.
Microsoft; "AppSharingMetricsThreshold table in Lync Server 2013"; https://technet.microsoft.com/en-us/library/jj205018.aspx; Oct. 2, 2012; 2 pages.
Microsoft; "AppSharingStream table in Lync Server 2013"; https://technet.microsoft.com/en-us/library/jj204808.aspx; Feb. 21, 2014; 5 pages.
Microsoft; "AudioClientEvent table in Lync Server 2013"; https://technet.microsoft.com/en-us/library/gg413086.aspx; Oct. 17, 2012; 2 pages.
Microsoft; "AudioSignal table in Lync Server 2013"; https://technet.microsoft.com/en-us/library/gg398064.aspx; Nov. 12, 2013; 3 pages.
Microsoft; "AudioStream table in Lync Server 2013"; https://technet.microsoft.com/en-us/library/gg425961.aspx; Oct. 2, 2012; 4 pages.
Microsoft; "CodecDescription table in Lync Server 2013"; https://technet.microsoft.com/en-us/library/jj204797.aspx; Oct. 17, 2012; 1 page.
Microsoft; "Conference table in Lync Server 2013"; https://technet.microsoft.com/en-us/library/gg425762.aspx; Oct. 2, 2012; 1 page
Microsoft; "Device table in Lync Server 2013"; https://technet.microsoft.com/en-us/library/gg398930.aspx; Oct. 2, 2012; 1 page.
Microsoft; "DeviceDriver table in Lync Server 2013"; https://technet.microsoft.com/en-us/library/gg398844.aspx; Oct. 2, 2012; 1 page.
Microsoft; "Dialog table in Lync Server 2013"; https://technet.microsoft.com/en-us/library/gg398313.aspx; Oct. 2, 2012; 1 page.
Microsoft; "Endpoint table in Lync Server 2013"; https://technet.microsoft.com/en-us/library/gg398327.aspx; Oct. 2, 2012; 1 page.
Microsoft; "EndpointSubnet table in Lync Server 2013"; https://technet.microsoft.com/en-us/library/gg398933.aspx; Oct. 2, 2012; 1 page.
Microsoft; "IP Address table in Lync Server 2013"; https://technet.microsoft.com/en-us/library/jj205077.aspx; Oct. 17, 2012; 1 page.
Microsoft; "MacAddress table in Lync Server 2013"; https://technet.microsoft.com/en-us/library/gg412761.aspx; Oct. 2, 2012; 1 page.

(56) References Cited

OTHER PUBLICATIONS

Microsoft; "MediaLine table in Lync Server 2013"; https://technet.microsoft.com/en-us/library/gg425920.aspx; Feb. 21, 2014; 3 pages.
Microsoft; "MonitoredRegionLink table in Lync Server 2013"; https://technet.microsoft.com/en-us/library/gg398874.aspx; Oct. 2, 2012; 1 page.
Microsoft; "MonitoredUserSiteLink table"; https://technet.microsoft.com/en-us/library/gg398233.aspx; Oct. 2, 2012; 1 page.
Microsoft; "NetworkConnectionDetail table in Lync Server 2013"; https://technet.microsoft.com/en-us/library/jj205185.aspx; Oct. 2, 2012; 1 page.
Microsoft; "PayloadDescription table in Lync Server 2013"; https://technet.microsoft.com/en-us/library/gg412971.aspx; Oct. 2, 2012; 1 page.
Microsoft; "PurgeSettings table (QoE) in Lync Server 2013"; https://technet.microsoft.com/en-us/library/jj204788.aspx; Oct. 2, 2012; 1 page.
Microsoft; "Region table in Lync Server 2013"; https://technet.microsoft.com/en-us/library/gg398235.aspx; Nov. 9, 2010; 1 page.
Microsoft; "Server table in Lync Server 2013"; https://technet.microsoft.com/en-us/library/gg398801.aspx; Oct. 2, 2012; 1 page.
Microsoft; "Session table in Lync Server 2013"; https://technet.microsoft.com/en-us/library/gg398635.aspx; Sep. 9, 2013; 2 pages.
Microsoft; "SessionCorrelation table in Lync Server 2013"; https://technet.microsoft.com/en-us/library/gg398091.aspx; Oct. 2, 2012; 1 page.
Microsoft; "Subnet table in Lync Server 2013"; https://technet.microsoft.com/en-us/library/gg398582.aspx; Oct. 2, 2012; 1 page.
Microsoft; "TraceRoute table in Lync Server 2013"; https://technet.microsoft.com/en-us/library/jj205205.aspx; Feb. 21, 2014; 1 page.
Microsoft; "User table in Lync Server 2013"; https://technet.microsoft.com/en-us/library/gg398505.aspx; Oct. 2, 2012; 1 page.
Microsoft; "UserAgent table in Lync Server 2013"; https://technet.microsoft.com/en-us/library/gg398939.aspx; May 25, 2012; 1 page.
Microsoft; "UserAgentDef table (QoE) in Lync Server 2013"; https://technet.microsoft.com/en-us/library/jj205259.aspx; Mar. 25, 2014; 2 pages.
Microsoft; "UserSite table in Lync Server 2013"; https://technet.microsoft.com/en-us/library/gg398256.aspx; Nov. 9, 2010; 1 page.
Microsoft; "VideoClientEvent table in Lync Server 2013"; https://technet.microsoft.com/en-us/library/gg399039.aspx; Oct. 2, 2012; 1 page.
Microsoft; "VideoMetricsThreshold table in Lync Server 2013"; https://technet.microsoft.com/en-us/library/jj204778.aspx; Oct. 2, 2012; 1 page.
Microsoft; "VideoStream table in Lync Server 2013"; https://technet.microsoft.com/en-us/library/gg425928.aspx; Dec. 13, 2013; 4 pages.
Microsoft; "QoE view details in Lync Server 2013"; https://technet.microsoft.com/en-us/library/jj688081.aspx; Oct. 3, 2012; 1 page.
Microsoft; "Sample QoE database queries in Lync Server 2013"; https://technet.microsoft.com/en-us/library/gg398100.aspx; Oct. 17, 2012; 1 page.
U.S. Appl. No. 14/929,460, Le Rudulier et al.
U.S. Appl. No. 15/010,960, Le Rudulier et al.
U.S. Appl. No. 15/080,755, Brisebois et al.
U.S. Appl. No. 15/081,104, Brisebois et al.
U.S. Appl. No. 14/819,233, Brisebois et al.
Campbell, Christopher S., et al.; "Expertise Identification using Email Communications"; ACM; Nov. 3, 2003; pp. 528-531.
Balog, Krisztian, et al.; "Finding Experts and their Details in E-mail Corpora"; ACM; May 23, 2006; pp. 1035-1036.
U.S. Appl. No. 13/906,241, Brisebois.
U.S. Appl. No. 13/906,246, Brisebois.
U.S. Appl. No. 13/906,255, Brisebois.
U.S. Appl. No. 14/047,162, Brisebois et al.
U.S. Appl. No. 14/089,427, Brisebois et al.
U.S. Appl. No. 14/265,973, Brisebois et al.
U.S. Appl. No. 14/297,944, Briseblis et al.
U.S. Appl. No. 14/298,095, Brisebois et al.
U.S. Appl. No. 14/335,205, Brisebois et al.
U.S. Appl. No. 14/631,826, Brisebois et al.
U.S. Appl. No. 14/660,697, Brisebois et al.
U.S. Appl. No. 14/674,270, Brisebois et al.
U.S. Appl. No. 14/672,715, Brisebois et al.
U.S. Appl. No. 14/683,441, Brisebois et al.
U.S. Appl. No. 14/683,513, Brisebois et al.
U.S. Appl. No. 14/683,462, Brisebois et al.
U.S. Appl. No. 14/683,453, Brisebois et al.
Microsoft, "Manage Dynamic Distribution Groups", Oct. 15, 2012, 2 pages.
Rubin, Courtney, "Study: Employees are Unproductive Half the Day", Mar. 2, 2011, 4 pages.
Natural Resources Management and Environment Department, "Land Cover Classification System", May 17, 2012, 4 pages.
Humanext, "Communicating to inform and engage people at work", May 25, 2012, 5 pages.
Lumincreative, "Lumin Synergy: Powerful Corporate Collaboration Software", http://www.lumincreative.com, Oct. 2013, 10 pages.
Syntegrity Group, "THINKahead", Mar. 2013, 16 pages.
Abdi, Herve, et al., "Principal Component Analysis", Jun. 30, 2010, 47 pages.
SharePoint, "Find the right people", http://discoversharepoint.com/people, Jun. 27, 2013, 13 pages.
Bennett, Madeline, "Endorsement feature degrades Linkedin as a professional network", the Inquirer, Oct. 19, 2012, 3 pages.
Breger, David, "Introducing Endorsements: Give Kudos with Just One Click", Linkedin Blog, Sep. 24, 2012, 3 pages.
Microsoft, "How DLP Rules are Applied to Evaluate Messages", Sep. 18, 2013, 5 pages.
Microsoft, "Define Your Own DLP Templates and Information Types", Sep. 30, 2013, 4 pages.
Microsoft, "Policy Templates from Microsoft Partners", Jan. 31, 2013, 1 page.
Microsoft, "DLP Policy Templates Supplied in Exchange", Feb. 4, 2013, 8 pages.
Microsoft, "DLP Policy Templates", Oct. 4, 2012, 4 pages.
Microsoft, "Data Loss Prevention", Mar. 21, 2013, 6 pages.
Pocsi, Gyorgy, "Find a free Meeting Room," http://android.metricscat.com, 2013, 8 pages.
Ragan, Steve, "5 More Post-Holiday BYOD Strategies and Considerations," www.csoonline.com, Jan. 2, 2014, 5 pages.
Duncan, Stacy, "Wendy's Franchisee Safeguards against Data Breaches with Intelligent Firewalls," http://m.hospitalitytechnology.edgl.com, Dec. 12, 2013, 4 pages.
Rubens, Paul, "Cybercrime Shopping List Study Points to Falling Prices," www.bbc.com/news/technology, Dec. 16, 2013, 3 pages.
Kaneshige, Tom, "BYOD Lawsuits Loom as Work Gets Personal," www.cio.com, Apr. 22, 2013, 3 pages.
Kaneshige, Tom, "BYOD Became the 'New Normal' in 2013," www.cio.com, Dec. 19, 2013, 3 pages.
Kaneshige, Tom, "The BYOD Troubleshoot: Security and Cost-Savings," www.cio.com, Mar. 30, 2012, 3 pages.
Eckersley, Peter, "How Unique is Your Web Browser?", Electronic Frontier Foundation, 2010, 19 pages.
Adamedes, Karen, "5 Truths about Performance Reviews. Are You Ready for Yours?", www.careerchickchat.com, Jan. 5, 2013, 8 pages.
Mosley, Eric, "Crowdsource Your Performance Reviews," HBR Blog Network, Jun. 15, 2012, 2 pages.
Monahan, Tom, "Big Idea 2014: The Couch-Potato-ification of Talent Measurement," Dec. 10, 2013, 7 pages.
SIGNiX; "Know Your Signer"; http://www.signix.com/how-it-works/digital-signature-identit-authentication; Aug. 10, 2014; 4 pages.
Lagorio-Chafkin, Christine; "35 under 35: When I Work: A Company that Incubated Itself"; www.inc.com; Jun. 24, 2014; 4 pages.
Paradiso Solutions; "Paradiso LMS Social Learning: What is Social Learning?"; https:www.paradisosolutions.com/social-learning-lms; Mar. 18, 2015; 5 pages.

(56) References Cited

OTHER PUBLICATIONS

McIntosh, Don; "List of Corporate Learning Management Systems"; elearningindustry.com/list-corporate-learning-management-systems; Oct. 3, 2014; 157 pages.
Talbot, Chris; "Level Platforms Adds Managed Print Service Features to Managed Workplace 2011"; http://www.channelinsider.com/c/a/Managed-Services-Level-Platform-Adds-Managed-Pri . . . ; Nov. 30, 2011; 4 pages
Messmer, Ellen; "Do we Need Data-Loss Prevention for Printers and Copiers? Canon USA Explains Why it Designed a DLP Product Specifically for its Multi-Function Peripherals"; Network World; Dec. 13, 2011; 4 pages.
Intermedia, Inc.; "How to Configure your Printer, Scanner, Copier, Web Script or SMTP Application to Work with an Exchange Account"; https://hosting.intermedia.net/support/kb/viewKBArticle.asp?id=2167; 2013; 3 pages.
Pujol, Josep M., et al.; "Extracting Reputation in Multi Agent Systems by Means of Social Network Topology"; AAMAS; Jul. 15-19, 2002; pp. 467-474.
Wikimedia Foundation, Inc.; "Microsoft Visual SourceSafe"; http://en.wikipedia.org/wiki/Microsoft_Visual_SourceSafe; last modified on Feb. 2, 2015; 6 pages.
Wikimedia Foundation, Inc.; "TinEye"; http://en.wikipedia.org/wiki/TinEye; last modified on Jan. 26, 2015;4 pages.
Microsoft; "Information Rights Management"; https://technet.microsoft.com/en-us/library/dd638140(v=exchg.150).aspx; Nov. 1, 2013; 7 pages.
Microsoft; "Document Fingerprinting"; https://technet.microsoft.com/en-us/library/dn635176(v=exchg.150).aspx; Sep. 11, 2014; 3 pages.
Wikimedia Foundation, Inc.; "Plagiarism Detection"; http://en.wikipedia.org/wiki/Plagiarism_detection; last modified on Mar. 19, 2015; 11 pages.
Kim, Yoohwan, et al.; "Anomaly Detection in Multiple Scale for Insider Threat Analysis"; CSIIRW'11, Oak Ridge, Tennessee; Oct. 2011; 4 pages.
Boudaoud, K., et al.; "Network Security Management with Intelligent Agents"; IEEE, Session Fourteen, Security Management (I); Apr. 2000; pp. 579-592.

\* cited by examiner

| Business Communications 🖉 ⦾ ✕ | General Communications 🖉 ⦾ ✕ | Governance 🖉 ⦾ ✕ |
|---|---|---|
| Partner<br>My sent and received messages<br>0<br>Last 30 Days | Internal<br>My sent and received messages<br>95<br>Last 30 Days | Encrypted<br>My sent and received messages<br>0<br>Last 30 Days |
| Partner<br>My staffs sent and received messages<br>0<br>Last 30 Days | Internal<br>My staffs sent and received messages<br>308<br>Last 30 Days | Encrypted<br>My staffs sent and received messages<br>0<br>Last 30 Days |
| Customer<br>My sent and received messages<br>18<br>Last 30 Days | External<br>My sent and received messages<br>31<br>Last 30 Days | Large Attachme...<br>My sent and received messages<br>2<br>Last 30 Days |
| Customer<br>My staffs sent and received messages<br>82<br>Last 30 Days | External<br>My staffs sent and received messages<br>148<br>Last 30 Days | Large Attachme...<br>My staffs sent and received messages<br>11<br>Last 30 Days |
| Competitor<br>My sent and received messages<br>5<br>Last 30 Days | Personal<br>My sent and received messages<br>6<br>Last 30 Days | |
| Competitor<br>My staffs sent and received messages<br>13<br>Last 30 Days | Personal<br>My staffs sent and received messages<br>44<br>Last 30 Days | |
| | Social Networking<br>My received messages<br>2<br>Last 30 Days | |
| | Social Networking<br>My staffs received messages<br>9<br>Last 30 Days | |

FIG. 9

Scope: Me ▼

Me — Message — Participant

Direction: Sent or Received
Sent Date: Last 30 Days

Add Search Parameters for Insight

| Name | Subject | Name |
| Department | Total Size | Message Address |
| Office | Message Type | Department |
| Job Title | Has External Recipients | Office |
| Manager - Name | Sent Time of Day | Mailbox Type |
| Was External | File Attachment - Extension | Was External |
| Was Addressed In To | File Attachment - File Name | Domain - Name |
| Was Addressed in Bcc | File Attachment - Last Modified Date | Domain - Classification |
| Was Addressed in Cc | File Attachment - Size | Direct Reports - Name |
| Delivery Time | Was Encrypted | Manager - Name |
| Response Time | Importance | Was Addressed In To |
| Received Time of Day | Sensitivity | Was Addressed In Bcc |
| Was Received After Hours | Original Message Id | Was Addressed In Cc |
| Was Sent After Hours | | Receipt Date |
| Was AD Account Enabled | | Delivery Time |
| | | Response Time |
| | | Received Time of Day |
| | | Was Received After Hours |

[Apply] [Cancel]

FIG. 10

SYSTEMS AND METHODS OF TRACKING CONTENT-EXPOSURE EVENTS

CROSS-REFERENCE TO RELATED APPLICATIONS

This patent application incorporates by reference the entire disclosure of a U.S. Patent Application bearing 14/683,513 and filed on Apr. 10, 2015.

BACKGROUND

Technical Field

The present disclosure relates generally to data security and more particularly, but not by way of limitation, to systems and methods of tracking content-exposure events.

History Of Related Art

Striking the balance between sharing information and protecting restricted data is an age-old problem. With the proliferation of multiple collaboration systems, remote access, and virtual work groups, it is harder than ever to know how content is being consumed. Also, because of complex access management schemes involving individual and group memberships, it is difficult to determine how many people have potential access to content if posted to a collaboration site. Email threads are particularly confounding, as people added later to the discussion have access to prior comments and content.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method is performed by a computer system. The method includes identifying a user-initiated precursor of an anticipated exposure event. The method also includes, in response to the identifying, automatically determining particular content that would be exposed if the exposure event were to occur. In addition, the method includes automatically determining one or more users to which the particular content would be exposed if the exposure event were to occur. Further, the method includes, before the exposure event occurs, publishing a result of the automatically determining to a user associated with the user-initiated precursor. Also, the method includes, in response to a detected occurrence of the exposure event, monitoring a plurality of communications platforms for follow-on exposure events in relation to the particular content which chain from the exposure event.

In one embodiment, an information handling system includes a processor. The processor is operable to implement a method. The method includes identifying a user-initiated precursor of an anticipated exposure event. The method also includes, in response to the identifying, automatically determining particular content that would be exposed if the exposure event were to occur. In addition, the method includes automatically determining one or more users to which the particular content would be exposed if the exposure event were to occur. Further, the method includes, before the exposure event occurs, publishing a result of the automatically determining to a user associated with the user-initiated precursor. Also, the method includes, in response to a detected occurrence of the exposure event, monitoring a plurality of communications platforms for follow-on exposure events in relation to the particular content which chain from the exposure event.

In one embodiment, a computer-program product includes a non-transitory computer-usable medium having computer-readable program code embodied therein. The computer-readable program code is adapted to be executed to implement a method. The method includes identifying a user-initiated precursor of an anticipated exposure event. The method also includes, in response to the identifying, automatically determining particular content that would be exposed if the exposure event were to occur. In addition, the method includes automatically determining one or more users to which the particular content would be exposed if the exposure event were to occur. Further, the method includes, before the exposure event occurs, publishing a result of the automatically determining to a user associated with the user-initiated precursor. Also, the method includes, in response to a detected occurrence of the exposure event, monitoring a plurality of communications platforms for follow-on exposure events in relation to the particular content which chain from the exposure event.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 9 illustrates an example of a user interface.

FIG. 10 illustrates an example of a user interface.

DETAILED DESCRIPTION OF ILLUSTRATIVE EMBODIMENTS OF THE INVENTION

This disclosure describes several non-limiting examples of processes for collecting information or data from multiple sources and analyzing the information to classify the data and to extract or determine additional information based on the collected data. The data sources can be internal to the business and/or external to the business. For example, the data sources can include sales databases, business or internal email systems, non-business or external email systems, social networking accounts, inventory databases, file directories, enterprise systems, customer relationship management (CRM) systems, organizational directories, collaboration systems (e.g., SharePoint™ servers), etc.

As used herein, the term "business," in addition to having its ordinary meaning, is intended to include any type of organization or entity. For example, a business can include a charitable organization, a governmental organization, an educational institution, or any other entity that may have one or more sources of data to analyze. Further, the user of any of the above terms may be used interchangeably unless explicitly used otherwise or unless the context makes clear otherwise. In addition, as used herein, the term "data" generally refers to electronic data or any type of data that can be accessed by a computing system.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

I. Example of a Networked Computing Environment

Figure 1:
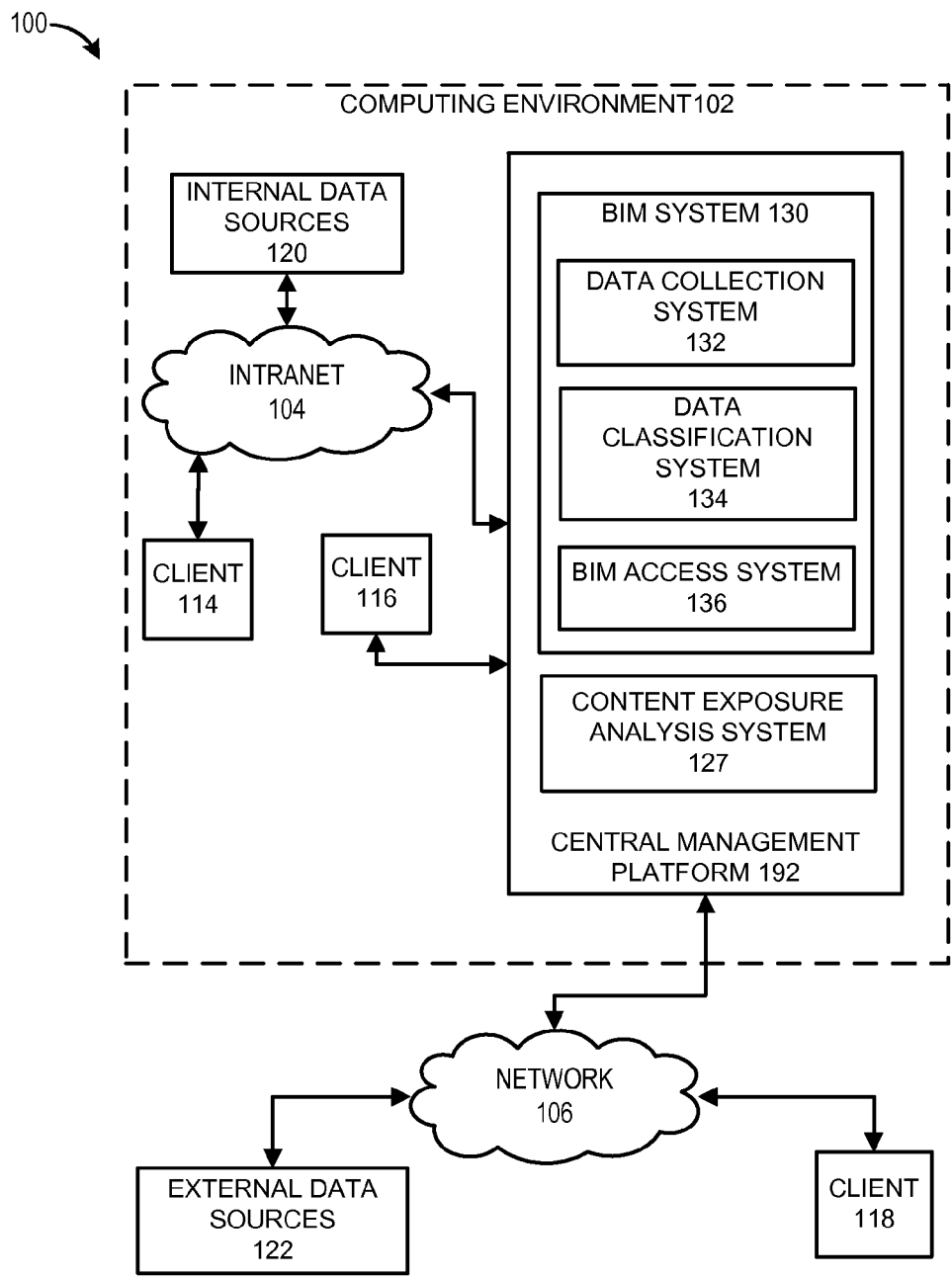
FIG. 1 illustrates an embodiment of a networked computing environment.

FIG. 1 illustrates an embodiment of a networked computing environment 100. The networked computing environment 100 can include a computing environment 102 that is associated with a business or organization. The computing environment 102 may vary based on the type of organization or business. However, generally, the computing environment 102 may include at least a number of computing systems. For example, the computing environment may include clients, servers, databases, mobile computing devices (e.g., tablets, laptops, smartphones, etc.), virtual computing devices, shared computing devices, networked computing devices, and the like. Further, the computing environment 102 may include one or more networks, such as intranet 104.

The computing environment 102 includes a central management platform 192. As illustrated, the central management platform 192 can include a BIM system 130 and a content-exposure analysis system 127. The central management platform 192 can include one or more computer systems; be unitary or distributed; span multiple locations; span multiple machines; or reside in a cloud, which may include one or more cloud components in one or more networks. In certain embodiments, these components of the central management platform 192 are operable to interact with the BIM system 130, for example, over the intranet 104. In certain other embodiments, these components of the central management platform 192 can be contained on a same computer system or have direct communication links such that no communication over the intranet 104 needs to occur. In various cases, communication among the components of the central management platform 192 can occur via a combination of the foregoing.

A user can access the central management platform 192 using any computing system, such as an information handling system, that can communicate with the central management platform 192. For example, the user can access the central management platform 192 using client 114, which can communicate with the central management platform 192 via the intranet 104, client 116, which can communicate via a direct communication connection with the central management platform 192, or client 118, which can communicate with the central management platform 192 via the network 106. As illustrated in FIG. 1, in some embodiments the client 118 may not be associated with the computing environment 102. In such embodiments, the client 118 and/or a user associated with the client 118 may be granted access to the central management platform 192. The clients 114, 116, and 118 may include any type of computing system including, for example, a laptop, desktop, smartphone, tablet, wearable or body-borne computer, or the like. In some embodiments, the central management platform 192 (e.g., the BIM system 130) may determine whether the user is authorized to access central management platform 192 as described in further detail below.

Using the BIM system 130, a user can examine the data available to a business regardless of where the data was generated or is stored. Further, in some embodiments, the user can use the BIM system 130 to identify trends and/or metadata associated with the data available to the BIM system 130. In certain embodiments, the BIM system 130 can access the data from internal data sources 120, external data sources 122, or a combination of the two. The data that can be accessed from the internal data sources 120 can include any data that is stored within the computing environment 102 or is accessed by a computing system that is associated with the computing environment 102. For example, the data may include information stored in employee created files, log files, archived files, internal emails, outgoing emails, received emails, received files, data downloaded from an external network or the Internet, not-yet-transmitted emails in a drafts folder, etc. The type of data is not limited and may depend on the organization or business associated with the computing environment 102. For example, the data can include sales numbers, contact information, vendor costs, product designs, meeting minutes, the identity of file creators, the identity of file owners, the identity of users who have accessed a file or are authorized to access a file, etc.

The data that can be accessed from the external data sources 122 can include any data that is stored outside of the computing environment 102 and is publicly accessible or otherwise accessible to the BIM system 130. For example, the data can include data from social networking sites, customer sites, Internet sites, or any other data source that is publicly accessible or which the BIM system 130 has been granted access. In some cases, a subset of the data may be unavailable to the BIM system 130. For example, portions of the computing environment 102 may be configured for private use.

The internal data sources 120 can include any type of computing system that is part of or associated with the computing environment 102 and is available to the BIM system 130. These computing systems can include database systems or repositories, servers (e.g., authentication servers, file servers, email servers, collaboration servers), clients, mobile computing systems (including e.g., tablets, laptops, smartphones, etc.), virtual machines, CRM systems, content-management platforms, directory services, such as lightweight directory access protocol (LDAP) systems, and the like. Further, in some cases, the internal data sources 120 can include the clients 114 and 116. The external data sources 122 can include any type of computing system that is not associated with the computing environment 102, but is accessible to the BIM system 130. For example, the external data sources 122 can include any computing systems associated with cloud services, social media services, hosted applications, etc.

The BIM system 130 can communicate with the internal data sources 120 via the intranet 104. The intranet 104 can include any type of wired and/or wireless network that enables computing systems associated with the computing environment 102 to communicate with each other. For example, the intranet 104 can include any type of a LAN, a WAN, an Ethernet network, a wireless network, a cellular network, a virtual private network (VPN) and an ad hoc network. In some embodiments, the intranet 104 may include an extranet that is accessible by customers or other users who are external to the business or organization associated with the computing environment 102.

The BIM system 130 can communicate with the external data sources 122 via the network 106. The network 106 can include any type of wired, wireless, or cellular network that enables one or more computing systems associated with the computing environment 102 to communicate with the external data sources 122 and/or any computing system that is not associated with the computing environment 102. In some cases, the network 106 can include the Internet.

The BIM system 130 can include a data collection system 132, a data classification system 134, and a BIM access system 136. The data collection system 132 can collect data or information from one or more data sources for processing by the BIM system 130. In some embodiments, the data collection system 132 can reformat the collected data to facilitate processing by the BIM system 130. Further, in some cases, the data collection system 132 may reformat collected data into a consistent or defined format that enables the comparison or processing of data that is of the same or a similar type, but which may be formatted differently because, for example, the data is obtained from different sources. The data collection system 132 is described in more detail below with reference to FIG. 2.

The data classification system 134 can store and classify the data obtained by the data collection system 132. In addition to predefined classifications, the data classification system 134 can identify and develop new classifications and associations between data using, for example, heuristics and probabilistic algorithms. The data classification system 134 is described in more detail below with reference to FIG. 3.

The BIM access system 136 can provide users with access to the BIM system 130. In some embodiments, the BIM access system 136 determines whether a user is authorized to access the BIM system 130. The BIM access system 136 enables a user to query one or more databases (not shown) of the data classification system 134 to obtain access to the data collected by the data collection system 132. Further, the BIM access system 136 enables a user to mine the data and/or to extract metadata by, for example, creating queries based on the data and the data classifications. Advantageously, in certain embodiments, because the data classification system 134 can classify data obtained from a number of data sources, more complex queries can be created compared to a system that can only query its own database or a single data source.

Additionally, in certain embodiments, the BIM access system 136 can enable users to create, share, and access query packages. As described in greater detail below, a query package can encapsulate one or more pre-defined queries, one or more visualizations of queried data, and other package attributes. When a user selects a query package, the query package can be executed in a determined manner in similar fashion to other queries. As an additional advantage, in some embodiments, because the data classification system 134 can use heuristics and probabilistic algorithms to develop and modify data classifications over time, user queries are not limited to a set of predefined search variables. The BIM access system 136 is described in more detail below with reference to FIG. 3.

In certain embodiments, the content-exposure analysis system 127 can project, track, and analyze exposure events related to communications and other content collected from the internal data sources 120 and/or the external data sources 122. An exposure event can be, for example, an event whose occurrence would result in content being exposed to one or more additional users. In some cases, increased exposure may be desirable (e.g., if trying to market product materials). In other cases, decreased exposure can be desirable (e.g., if content id sensitive or confidential). Example operation of the content-exposure analysis system 127 will be described in greater detail with respect to FIGS. 11-19.

II. Examples of Collecting, Classifying, and Querying Data

Figure 2:
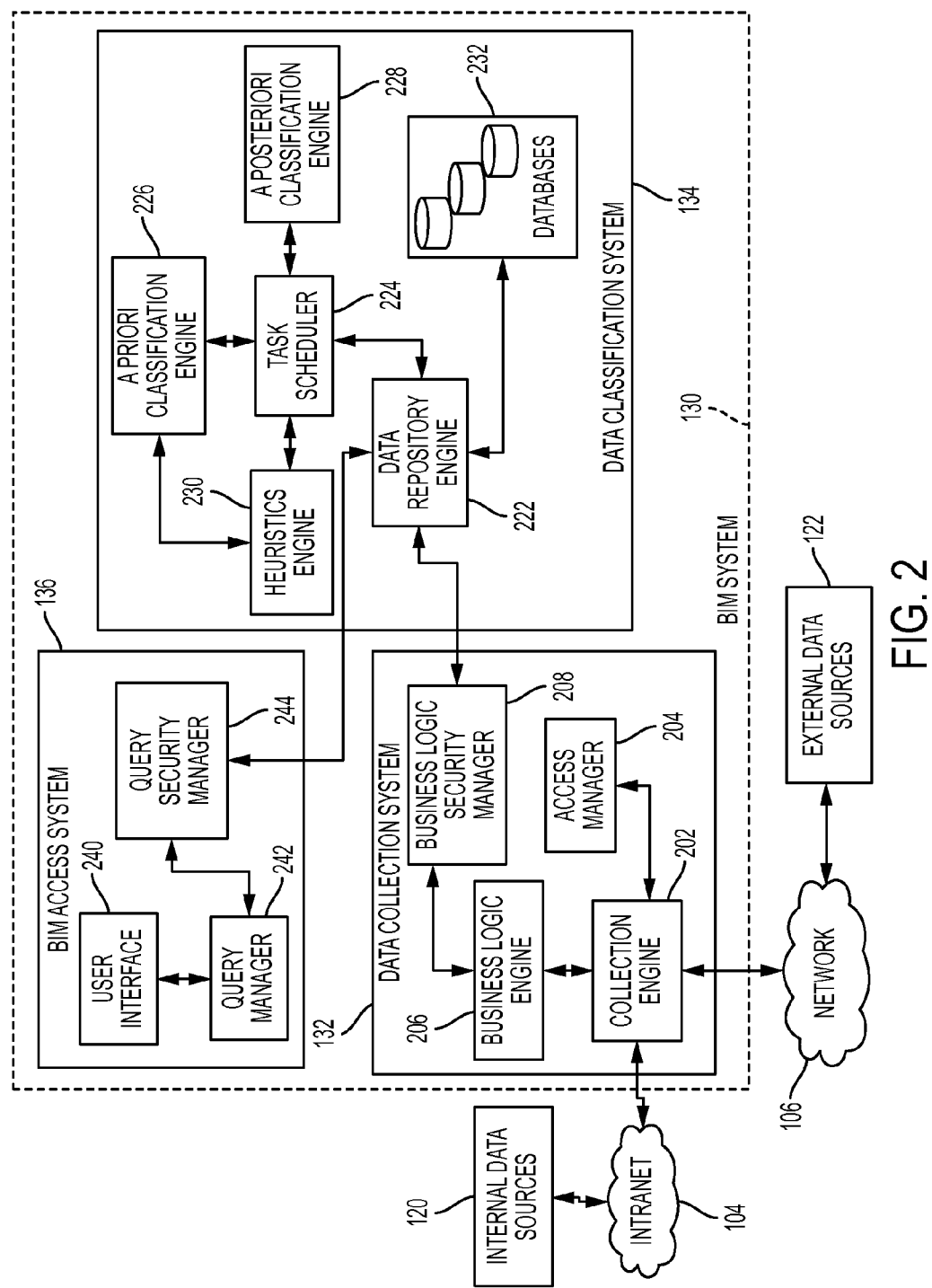
FIG. 2 illustrates an embodiment of a Business Insight on Messaging (BIM) system.

FIG. 2 illustrates an embodiment of an implementation of the BIM system 130. As previously described above, the BIM system 130 can include a data collection system 132 configured to, among other things, collect data from the internal data sources 120 and/or the external data sources 122. The data collection system 132 can include a collection engine 202, an access manager 204, a business logic engine 206, and a business logic security manager 208.

Generally, the collection engine 202 may access the internal data sources 120 thereby providing the BIM system 130 with access to data that is stored by or generated by the internal data sources 120. This data can include any data that may be created, accessed, or received by a user or in response to the actions of a user who is associated with the computing environment 102. Further, in some embodiments, the collection engine 202 can access the external data sources 122 thereby providing the BIM system 130 with access to data from the external data sources 122. In some embodiments, the data can include metadata. For example, supposing that the collection engine 202 accesses a file server, the data can include metadata associated with the files stored on the file server, such as the file name, file author, file owner, time created, last time edited, etc.

In some cases, a number of internal data sources 120 and/or external data sources 122 may require a user or system to be identified and/or authenticated before access to the data source is granted. Authentication may be required for a number of reasons. For example, the data source may provide individual accounts to users, such as a social networking account, email account, or collaboration system account. As another example, the data source may provide different features based on the authorization level of a user. For example, a billing system may be configured to allow all employees of an organization to view invoices, but to only allow employees of the accounting department to modify invoices.

For data sources that require authentication or identification of a specific user, the access manager 204 can facilitate access to the data sources. The access manager 204 can manage and control credentials for accessing the data sources. For example, the access manager 204 can store and manage user names, passwords, account identifiers, certificates, tokens, and any other information that can be used to access accounts associated with one or more internal data sources 120 and/or external data sources 122. For instance, the access manager 204 may have access to credentials associated with a business's Facebook™ or Twitter™ account. As another example, the access manager may have access to credentials associated with an LDAP directory, a file management system, or employee work email accounts.

In some embodiments, the access manager 204 may have credentials or authentication information associated with a master or super user account enabling access to some or all of the user accounts without requiring credentials or authentication information associated with each of the users. In some cases, the collection engine 202 can use the access manager 204 to facilitate accessing internal data sources 120 and/or external data sources 122.

The business logic engine 206 can include any system that can modify or transform the data collected by the collection engine 202 into a standardized format. In some embodiments, the standardized format may differ based on the data source accessed and/or the type of data accessed. For example, the business logic engine 206 may format data associated with emails, data associated with files stored at the computing environment 102, data associated with web pages, and data associated with research files differently. However, each type of data may be formatted consistently. Thus, for example, data associated with product design files may be transformed or abstracted into a common format regardless of whether the product design files are of the same type. As a second example, suppose that the business logic engine 206 is configured to record time using a 24-hour clock format. In this second example, if one email application records the time an email was sent using a 24-hour clock format, and a second email application uses a 12-hour clock format, the business logic engine 206 may reformat the data from the second email application to use a 24-hour clock format In some embodiments, a user may define the format for processing and storing different types of data. In other embodiments, the business logic engine 206 may identify a standard format to use for each type of data based on, for example, the format that is most common among similar types of data sources, the format that reduces the size of the information, or any other basis that can be used to decide a data format.

The business logic security manager 208 can include any system that can implement security and data access policies for data accessed by the collection engine 202. In some embodiments, the business logic security manager 208 may apply the security and data access policies to data before the data is collected as part of a determination of whether to collect particular data. For example, an organization may designate a private folder or directory for each employee and the data access policies may include a policy to not access any files or data stored in the private directory. Alternatively, or in addition, the business logic security manager 208 may apply the security and data access policies to data after it is collected by the collection engine 202. Further, in some cases, the business logic security manager 208 may apply the security and data access policies to the abstracted and/or reformatted data produced by the business logic engine 206. For example, suppose the organization associated with the computing environment 102 has adopted a policy of not collecting emails designated as personal. In this example, the business logic security manager 208 may examine email to determine whether it is addressed to an email address designated as personal (e.g., email addressed to family members) and if the email is identified as personal, the email may be discarded by the data collection system 132 or not processed any further by the BIM system 130.

In some embodiments, the business logic security manager 208 may apply a set of security and data access policies to any data or metadata provided to the classification system 134 for processing and storage. These security and data access policies can include any policy for regulating the storage and access of data obtained or generated by the data collection system 132. For example, the security and data access policies may identify the users who can access the data provided to the data classification system 134. The determination of which users can access the data may be based on the type of data. The business logic security manager 208 may tag the data with an identity of the users, or class or role of users (e.g., mid-level managers and more senior) who can access the data. As another example, of a security and data access policy, the business logic security manager 208 may determine how long the data can be stored by the data classification system 134 based on, for example, the type of data or the source of the data.

After the data collection system 132 has collected and, in some cases, processed the data obtained from the internal data sources 120 and/or the external data sources 122, the data may be provided to the data classification system 134 for further processing and storage. The data classification system 134 can include a data repository engine 222, a task scheduler 224, an a priori classification engine 226, an a posteriori classification engine 228, a heuristics engine 230 and a set of databases 232.

The data repository engine 222 can include any system for storing and indexing the data received from the data collection system 132. The data repository engine 222 can store the data, including any generated indexes, at the set of databases 232, which can include one or more databases or repositories for storing data. In some cases, the set of databases 232 can store data in separate databases based on any factor including, for example, the type of data, the source of data, or the security level or authorization class associated with the data and the class of users who can access the data.

In some implementations, the set of databases 232 can dynamically expand and, in some cases, the set of databases 232 may be dynamically structured. For example, if the data repository engine 222 receives a new type of data that includes metadata fields not supported by the existing databases of the set of databases 232, the data repository engine 222 can create and initialize a new database that includes the metadata fields as part of the set of databases 232. For instance, suppose the organization associated with the computing environment 102 creates its first social media account for the organization to expand its marketing initiatives. Although the databases 232 may have fields for customer information and vendor information, it may not have a field identifying whether a customer or vendor has indicated they "like" or "follow" the organization on its social media page. The data repository engine 222 can create a new field in the databases 232 to store this information and/or create a new database to capture information extracted from the social media account including information that relates to the organization's customers and vendors.

In certain embodiments, the data repository engine 222 can create abstractions of and/or classify the data received from the data collection system 132 using, for example, the task scheduler 224, the a priori classification engine 226, the a posteriori classification engine 228, and the heuristics engine 230. The task scheduler 224 can include any system that can manage the abstraction and classification of the data received from the data collection system 132. In some embodiments, the task scheduler 224 can be included as part of the data repository engine 222.

Data that is to be classified and/or abstracted can be supplied to the task scheduler 224. The task scheduler 224 can supply the data to the a priori classification engine 226, which can include any system that can classify data based on a set of user-defined, predefined, or predetermined classifications. These classifications may be provided by a user (e.g., an administrator) or may be provided by the developer of the BIM system 130. Although not limited as such, the predetermined classifications generally include objective classifications that can be determined based on attributes associated with the data. For example, the a priori classification engine 226 can classify communications based on whether the communication is an email, an instant message, or a voice mail. As a second example, files may be classified based on the file type, such as whether the file is a drawing file (e.g., an AutoCAD™ file), a presentation file (e.g., a PowerPoint™ file), a spreadsheet (e.g., an Excel™ file), a word processing file (e.g., a Word™ file), etc. Although not limited as such, the a priori classification engine 226 generally classifies data at or substantially near the time of collection by the collection engine 202. The a priori classification engine 226 can classify the data prior to the data being stored in the databases 232. However, in some cases, the data may be stored prior to or simultaneously with the a priori classification engine 226 classifying the data. The data may be classified based on one or more characteristics or pieces of metadata associated with the data. For example, an email may be classified based on the email address, a domain or provider associated with the email (e.g., a Yahoo® email address or a corporate email address), or the recipient of the email.

In addition to, or instead of, using the a priori classification engine 226, the task scheduler 224 can provide the data to the a posteriori classification engine 228 for classification or further classification. The a posteriori classification engine 228 can include any system that can determine trends with respect to the collected data. Although not limited as such, the a posteriori classification engine 228 generally classifies data after the data has been collected and stored at the databases 232. However, in some cases, the a posteriori classification engine 228 can also be used to classify data as it is collected by the collection engine 202. Data may be processed and classified or reclassified multiple times by the a posteriori classification engine 228. In some cases, the classification and reclassification of the data occurs on a continuing basis. In other cases, the classification and reclassification of data occurs during specific time periods of events. For example, data may be reclassified each day at midnight or once a week. As another example, data may be reclassified each time one or more of the a posteriori algorithms is modified or after the collection of new data.

In some cases, the a posteriori classification engine 228 classifies data based on one or more probabilistic algorithms. The probabilistic algorithms may be based on any type of statistical analysis of the collected data. For example, the probabilistic algorithms may be based on Bayesian analysis or probabilities. Further, Bayesian inferences may be used to update the probability estimates calculated by the a posteriori classification engine 228. In some implementations, the a posteriori classification engine 228 may use machine learning techniques to optimize or update the a posteriori algorithms. In some embodiments, some of the a posteriori algorithms may determine the probability that a piece or set of data (e.g., an email) should have a particular classification based on an analysis of the data as a whole. Alternatively, or in addition, some of the a posteriori algorithms may determine the probability that a set of data should have a particular classification based on the combination of probabilistic determinations associated with subsets of the data, parameters, or metadata associated with the data (e.g., classifications associated with the content of the email, the recipient of the email, the sender of the email, etc.).

For example, continuing with the email example, one probabilistic algorithm may be based on the combination of the classification or determination of four characteristics associated with the email, which may be used to determine whether to classify the email as a personal email, or non-work related. The first characteristic can include the probability that an email address associated with a participant (e.g., sender, recipient, BCC recipient, etc.) of the email conversation is used by a single employee. This determination may be based on the email address itself (e.g., topic based versus name based email address), the creator of the email address, or any other factor that can be used to determine whether an email address is shared or associated with a particular individual. The second characteristic can include the probability that keywords within the email are not associated with peer-to-peer or work-related communications. For example, terms of endearment and discussion of children and children's activities are less likely to be included in work-related communications. The third characteristic can include the probability that the email address is associated with a participant domain or public service provider (e.g., Yahoo® email or Google® email) as opposed to a corporate or work email account. The fourth characteristic can include determining the probability that the message or email thread can be classified as conversational as opposed to, for example, formal. For example, a series of quick questions in a thread of emails, the use of a number of slang words, or excessive typographical errors may indicate that an email is likely conversational. The a posteriori classification engine 228 can use the determined probabilities for the above four characteristics to determine the probability that the email communication is personal as opposed to, for example, work-related, or spam email.

The combination of probabilities may not total 100%. Further, the combination may itself be a probability and the classification can be based on a threshold determination. For example, the threshold may be set such that an email is classified as personal if there is a 90% probability for three of the four above parameters indicating the email is personal (e.g., email address is used by a single employee, the keywords are not typical of peer-to-peer communication, at least some of the participant domains are from known public service providers, and the message thread is conversational).

As another example of the a posteriori classification engine 228 classifying data, the a posteriori classification engine 228 can use a probabilistic algorithm to determine whether a participant of an email is a customer. The a posteriori classification engine 228 can use the participant's identity (e.g., a customer) to facilitate classifying data that is associated with the participant (e.g., emails, files, etc.). To determine whether the participant should be classified as a customer, the a posteriori classification engine 228 can examiner a number of parameters including a relevant Active Directory Organizational Unit (e.g., sales, support, finance) associated with the participant and/or other participants in communication with the participant, the participant's presence in forum discussions, etc. In some cases, characteristics used to classify data may be weighted differently as part of the probabilistic algorithm. For example, email domain may be a poor characteristic to classify a participant in some cases because the email domain may be associated with multiple roles. For instance, Microsoft® may be a partner, a customer, and a competitor.

In some implementations, a user (e.g., an administrator) can define the probabilistic algorithms used by the a posteriori classification engine 228. For example, suppose customer Y is a customer of business X and that the management of business X is interested in tracking the percentage of communication between business X and customer Y that relates to sales. Further, suppose that a number of employees from business X and a number of employees from business Y are in communication via email. Some of these employees may be in communication to discuss sales. However, it is also possible that some of the employees may be in communication for technical support issues, invoicing, or for personal reasons (e.g., a spouse of a business X employee may work at customer Y). Thus, in this example, to track the percentage of communication between business X and customer Y that relates to sales the user may define a probabilistic algorithm that classifies communications based on the probability that the communication relates to sales. The algorithm for determining the probability may be based on a number of pieces of metadata associated with each communication. For example, the metadata may include the sender's job title, the recipient's job title, the name of the sender, the name of the recipient, whether the communication identifies a product number or an order number, the time of communication, a set of keywords in the content of the communication, etc.

Using the a posteriori classification engine 228, data may be classified based on metadata associated with the data. For example, the communication in the above example can be classified based on whether it relates to sales, supplies, project development, management, personnel, or is personal. The determination of what the data relates to can be based on any criteria. For example, the determination may be based on keywords associated with the data, the data owner, the data author, the identity or roles of users who have accessed the data, the type of data file, the size of the file, the data the file was created, etc.

In certain embodiments, the a posteriori classification engine 228 can use the heuristics engine 230 to facilitate classifying data. Further, in some cases, the a posteriori classification engine 228 can use the heuristics engine 230 to validate classifications, to develop probable associations between potentially related content, and to validate the associations as the data collection system 132 collects more data. In certain embodiments, the a posteriori classification engine 228 may base the classifications of data on the associations between potentially related content. In some implementations, the heuristic engine 230 may use machine learning techniques to optimize or update the heuristic algorithms.

In some embodiments, a user (e.g., an administrator) can verify whether the data or metadata has been correctly classified. Based on the result of this verification, in some cases, the a posteriori classification engine 228 may correct or update one or more classifications of previously processed or classified data. Further, in some implementations, the user can verify whether two or more pieces of data or metadata have been correctly associated with each other. Based on the result of this verification, the a posteriori classification engine 228 using, for example, the heuristics engine 230 can correct one or more associations between previously processed data or metadata. Further, in certain embodiments, one or more of the a posteriori classification engine 228 and the heuristics engine 230 may update one or more algorithms used for processing the data provided by the data collection system 132 based on the verifications provided by the user.

In some embodiments, the heuristics engine 230 may be used as a separate classification engine from the a priori classification engine 226 and the a posteriori classification engine 228. Alternatively, the heuristics engine 230 may be used in concert with one or more of the a priori classification engine 226 and the a posteriori classification engine 228. Similar to the a posteriori classification engine 228, the heuristics engine 230 generally classifies data after the data has been collected and stored at the databases 232. However, in some cases, the heuristics engine 230 can also be used to classify data as it is collected by the collection engine 202.

The heuristics engine 230 can use any type of heuristic algorithm for classifying data. For example, the heuristics engine 230 can determine whether a number of characteristics are associated with the data and based on the determination, classify the data. For example, data that mentions a product, includes price information, addresses (e.g., billing and shipping addresses), and quantity information may be classified as sales data. In some cases, the heuristics engine 230 can classify data based on a subset of characteristics. For example, if a majority or two-thirds of characteristics associated with a particular classification are identified as existing in a set of data, the heuristics engine 230 can associate the classification with the set of data. In some cases, the heuristics engine 230 determines whether one or more characteristics are associated with the data. In other words, the heuristics engine can determine whether a particular characteristic is or is not associated with the data. Alternatively, or in addition, the heuristics engine 230 can determine the value or attribute of a particular characteristic associated with the data. The value or attribute of the characteristic may then be used to determine a classification for the data. For example, one characteristic that may be used to classify data is the length of the data. For instance, in some cases, a long email may make one classification more likely that a short email.

The a priori classification engine 226 and the a posteriori classification engine 228 can store the data classification at the databases 232. Further, the a posteriori classification engine 228 and the heuristics engine 230 can store the probable associations between potentially related data at the databases 232. In some cases, as classifications and associations are updated based on, for example, user verifications or updates to the a posteriori and heuristic classification and association algorithms, the data or metadata stored at the databases 232 can be modified to reflect the updates.

Users can communicate with the BIM system 130 using a client computing system (e.g., client 114, client 116, or client 118). In some cases, access to the BIM system 130, or to some features of the BIM system 130, may be restricted to users who are using clients associated with the computing environment 102. As described above, in some cases, at least some users can access the BIM system 130 to verify classifications and associations of data by the data classification system 134. In addition, in some cases, at least some users can access at least some of the data and/or metadata stored at the data classification system 134 using the BIM access system 136. The BIM access system 136 can include a user interface 240, a query manager 242, and a query security manager 244.

The user interface 240 can generally include any system that enables a user to communicate with the BIM system 130. Further, the user interface 240 enables the user to submit a query to the BIM system 130 to access the data or metadata stored at the databases 232. Moreover, the query can be based on any number of or type of data or metadata fields or variables. Advantageously, in certain embodiments, by enabling, a user to create a query based on any number or type of fields, complex queries can be generated. Further, because the BIM system 130 can collect and analyze data from a number of internal and external data sources, a user of the BIM system 130 can extract data that is not typically available by accessing a single data source. For example, a user can query the BIM system 130 to locate all personal messages sent by the members of the user's department within the last month. As a second example, a user can query the BIM system 130 to locate all helpdesk requests received in a specific month outside of business hours that were sent by customers from Europe. As an additional example, a product manager may create a query to examine customer reactions to a new product release or the pitfalls associated with a new marketing campaign. The query may return data that is based on a number of sources including, for example, emails received from customers or users, Facebook® posts, Twitter® feeds, forum posts, quantity of returned products, etc.

Further, in some cases, a user can create a relatively simple query to obtain a larger picture of an organization's knowledge compared to systems that are incapable of integrating the potentially large number of information sources used by some businesses or organizations. For example, a user can query the BIM system 130 for information associated with customer X over a time range. In response, the BIM system 130 may provide the user with all information associated with customer X over the time range, which can include who communicated with customer X, the percentage of communications relating to specific topics (e.g., sales, support, etc.), the products designed for customer X, the employees who performed any work relating to customer X and the employees' roles, etc. This information may not be captured by a single source. For example, the communications may be obtained from an email server, the products may be identified from product drawings, and the employees and their roles may be identified by examining who accessed specific files in combination with the employees' human resources (HR) records.

The query manager 242 can include any system that enables the user to create the query. The query manager 242 can cause the available types of search parameters for searching the databases 232 to be presented to a user via the user interface 240. These search parameter types can include any type of search parameter that can be used to form a query for searching the databases 232. For example, the search parameter types can include names (e.g., employee names, customer names, vendor names, etc.), data categories (e.g., sales, invoices, communications, designs, miscellaneous, etc.), stored data types (e.g., strings, integers, dates, times, etc.), data sources (e.g., internal data sources, external data sources, communication sources, sales department sources, product design sources, etc.), dates, etc. In some cases, the query manager 242 can also parse a query provided by a user. For example, some queries may be provided using a text-based interface or using a text-field in a Graphical User Interface (GUI). In such cases, the query manager 242 may be configured to parse the query.

The query manager 242 can further include any system that enables the user to create or select a query package that serves as the query. In certain embodiments, the query manager 242 can maintain query packages for each user, group of users, and/or the like. The query packages can be stored, for example, in a SQL database that maintains each user's query packages in a table by a unique identifier. In some embodiments, each user may have a profile that includes a list of package identifiers for that user. The query manager 242 can cause query packages associated with the user to be presented and made selectable via the user interface 240. In various embodiments, the query manager 242 can also facilitate creation of new query packages. New query packages can be made accessible to users in various ways. For example, the new query packages can be created by the user, shared with the user by another user, pushed to the user by an administrator, or created in another fashion.

Further, the query manager 242 can cause any type of additional options for querying the databases 232 to be presented to the user via the user interface 240. These additional options can include, for example, options relating to how query results are displayed or stored.

In some cases, access to the data stored in the BIM system 130 may be limited to specific users or specific roles. For example, access to the data may be limited to "Bob" or to senior managers. Further, some data may be accessible by some users, but not others. For example, sales managers may be limited to accessing information relating to sales, invoicing, and marketing, technical managers may be limited to accessing information relating to product development, design and manufacture, and executive officers may have access to both types of data, and possibly more. In certain embodiments, the query manager 242 can limit the search parameter options that are presented to a user for forming a query based on the user's identity and/or role.

The query security manager 244 can include any system for regulating who can access the data or subsets of data. The query security manager 244 can regulate access to the databases 232 and/or a subset of the information stored at the databases 232 based on any number and/or types of factors.

For example, these factors can include a user's identity, a user's role, a source of the data, a time associated with the data (e.g., the time the data was created, a time the data was last accessed, an expiration time, etc.), whether the data is historical or current, etc.

Further, the query security manager 244 can regulate access to the databases 232 and/or a subset of the information stored at the databases 232 based on security restrictions or data access policies implemented by the business logic security manager 208. For example, the business logic security manager 208 may identify all data that is "sensitive" based on a set of rules, such as whether the data mentions one or more keywords relating to an unannounced product in development. Continuing this example, the business logic security manager 208 may label the sensitive data as, for example, sensitive, and may identify which users or roles, which are associated with a set of users, can access data labeled as sensitive. The query security manager 244 can then regulate access to the data labeled as sensitive based on the user or the role associated with the user who is accessing the databases 232.

Although illustrated separately, in some embodiments, the query security manager 244 can be included as part of the query manager 242. Further, in some cases, one or both of the query security manager 244 and the query manager 242 can be included as part of the user interface 240. In certain embodiments, some or all of the previously described systems can be combined or further divided into additional systems. Further, some or all of the previously described systems may be implemented in hardware, software, or a combination of hardware and software.

Figure 3:
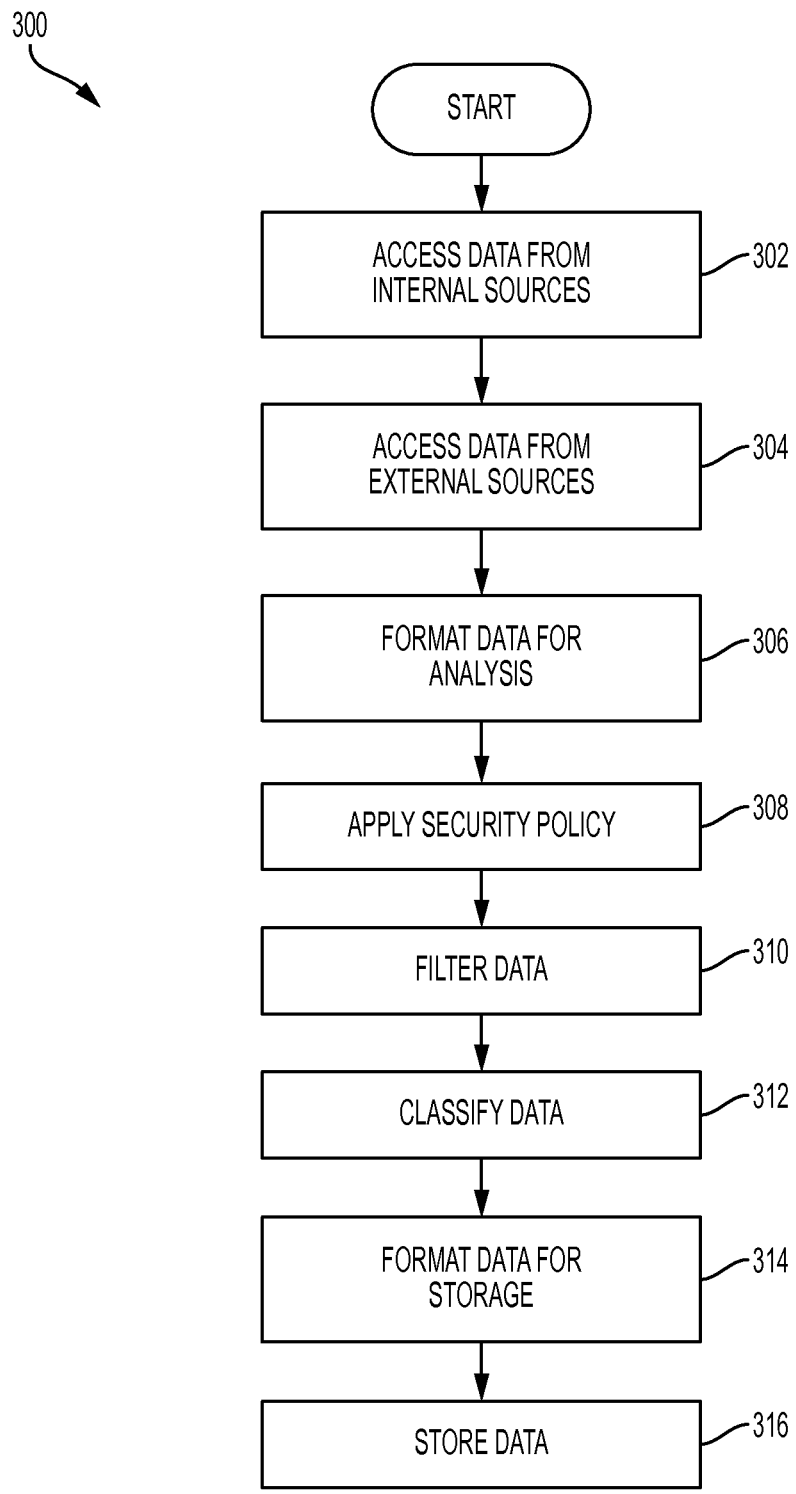
FIG. 3 illustrates an example of a data collection process.

FIG. 3 presents a flowchart of an example of a data collection process 300. The process 300 can be implemented by any system that can access one or more data sources to collect data for storage and analysis. For example, the process 300, in whole or in part, can be implemented by one or more of the data collection system 132, the collection engine 202, the access manager 204, the business logic engine 206, and the business logic security manager 208. In some cases, the process 300 can be performed generally by the BIM system 130. Although any number of systems, in whole or in part, can implement the process 300, to simplify discussion, the process 300 will be described in relation to specific systems or subsystems of the BIM system 130.

The process 300 begins at block 302 where, for example, the collection engine 202 accesses data from the internal data sources 120. At block 304, the collection engine 202 accesses data from the external data sources 122. In some cases, either the block 302 or 304 may be optional. Accessing the data may include obtaining the data or a copy of the data from the internal data sources 120. Further, accessing the data may include accessing metadata associated with the data. In some embodiments, the collection engine 202 may obtain copies of the metadata or access the data to obtain or determine metadata associated with the data without obtaining a copy of the data. For example, in some cases, the collection engine 202 may access email from an email server to obtain metadata (e.g., sender, recipient, time sent, whether files are attached, etc.) associated with email messages with or, in some cases, without obtaining a copy of the email.

As previously described, accessing one or more of the internal data sources 120 and the external data sources 122 may involve using one or more credentials or accessing one or more accounts associated with the data sources. In such embodiments, the collection engine 202 may use the access manager 204 to access the credentials and/or to facilitate accessing the data sources.

Generally, although not necessarily, the data obtained at blocks 302 and 304 is raw data that is obtained in the format that the data is stored at the data sources with little to no modification. At block 306, the business logic engine 206, as described above, can reformat or transform the accessed or collected data for analysis and/or storage. Reformatting the accessed or collected data can include formatting the data to enable further processing by the BIM system 130. Further, reformatting the accessed or collected data can include formatting the data in a format specified by a user (e.g., an administrator). In addition, in certain cases, reformatting the data can include extracting metadata from the accessed or collected data. In some cases, block 306 can include abstracting the data to facilitate analysis. For example, assuming the data under analysis is an email, a number of users may be identified. For instance, an email may include a sender, one or more recipients, which may also include users that are carbon copied, or listed on the CC line, and Blind Carbon Copied, or listed on the BCC line, and, in some cases, non-user recipients, such as lists or email addresses that result in a copy of the email being placed in an electronic folder for storage. Each of these users can be abstracted as "communication participant." The data can then be analyzed and/or stored with each user identified, for example, as a "communication participant."

As another example of abstracting the data, the text content of each type of message can be abstracted as "message body." Thus, an email, a Twitter® post, and a Facebook® post, and a forum post, and a product review can all be abstracted as "message body." By abstracting data, the BIM system 130 enables more in-depth searching across multiple data sources. For example, a user can search for all messages associated with communication participant X. The result of the search can include any type of message that is associated with user X including emails sent by user X, emails received by user X, product review by user X, Twitter® posts by user X, etc. In some embodiments, the databases 232 may store the abstracted or transformed data and the original data or references to the original sources of data. In other embodiments, the databases 232 may store the abstracted or transformed data in place of the original data.

In some cases, reformatting the data may be optional. For example, in cases where the collection engine 202 collects metadata from sources that share a common or substantially similar data storage format, the block 306 may be unnecessary.

At block 308, the business logic security manager 208 applies a security or data access policy to the collected data. Applying the security policy can include preventing the collection engine 202 from accessing some data. For example, applying the security policy can include preventing the collection engine 202 from accessing encrypted files, files associated with a specific project or user, or files marked private. Further, applying the security policy can include marking or identifying data, based on the security policy, that should not be stored at the databases 232, that should be accessible by a set of users or roles, or that should be inaccessible by a set of users or roles. The business logic security manager 208 can filter any data marked for exclusion from storage in the databases 232 at block 310. Further, the business logic security manager 208 and/or the business logic engine 206 can filter out any data to be excluded based on a data access policy, which can be based on any type of factor for excluding data. For example, data may be filtered based on the age of the data, such as files created more than five years ago or emails more than two years old.

Figure 4:
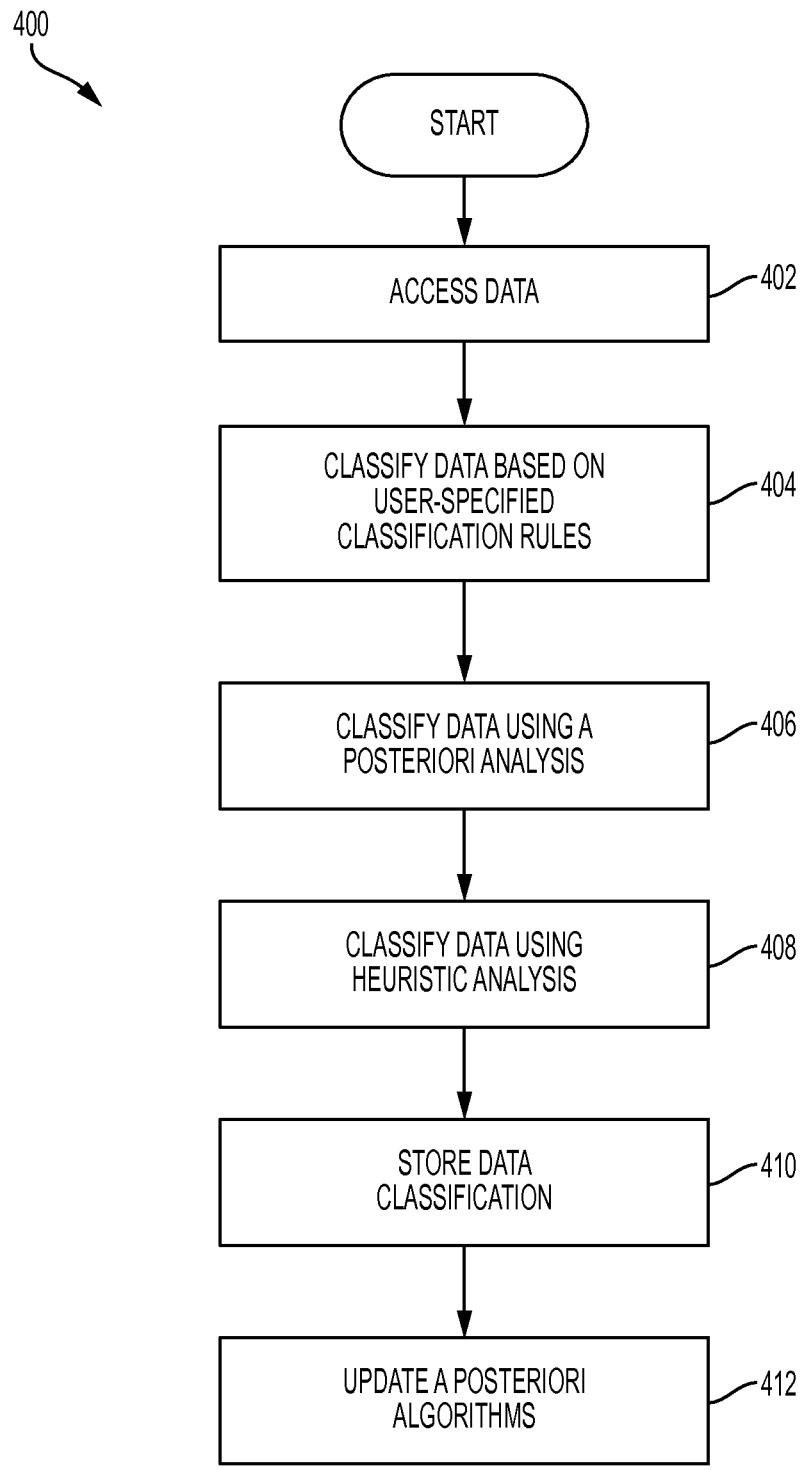
FIG. 4 illustrates an example of a data classification process.

At block 312, the business logic engine 206 or the business logic security manager 208 may classify the collected and/or filtered data. The data may be classified based on, for example, who can access the data, the type of data, the source of the data, or any other factor that can be used to classify data. In some embodiments, the data may be provided to the data classification system 134 for classification. Some non-limiting embodiments of a process for classifying the data are described in further detail below with respect to the process 400, which is illustrated in FIG. 4.

The business logic engine 206 further formats the data for storage at block 314. Formatting the data for storage can include creating a low-level abstraction of the data, transforming the data, or extracting metadata for storage in place of the data. In some cases, block 314 can include some or all of the embodiments described above with respect to the block 306. In some embodiments, data may go through one abstraction or transformation process at the block 306 to optimize the data for analysis and go through another abstraction or transformation process at the block 314 to optimize the data for storage and/or query access. In some embodiments, the metadata may be stored in addition to the data. Further, the metadata, in some cases, may be used for querying the databases 232. For example, a user can search the databases 232 for information based on one or more metadata fields. In some embodiments, one or more of the blocks 306 and 314 may be optional.

At block 316, the data collection system 132 can cause the data to be stored at, for example, the databases 232. This stored data can include one or more of the collected data, the metadata, and the abstracted data. In some embodiments, storing the data can include providing the data to the data repository engine 222 for indexing. In such embodiments, the data repository engine 222 can store the indexed data at the databases 232.

Although the process 300 was presented above in a specific order, it is possible for the operations of the process 300 to be performed in a different order or in parallel. For example, the business logic security manager 208 may perform the block 308, at least in part, prior to or in parallel with the blocks 302 and 304. As a second example, the business logic engine 206 may perform the block 306 as each item of data is accessed or after a set of data is accessed at the blocks 302 and 304.

FIG. 4 presents a flowchart of an example of a data classification process 400. The process 400 can be implemented by any system that can classify data and/or metadata. For example, the process 400, in whole or in part, can be implemented by one or more of the data classification system 134, the data repository engine 222, the task scheduler 224, the a priori classification engine 226, the a posteriori classification engine 228, and the heuristics engine 230. In some cases, the process 400 can be performed generally by the BIM system 130. Although any number of systems, in whole or in part, can implement the process 400, to simplify discussion, the process 400 will be described in relation to specific systems or subsystems of the BIM system 130.

The process 400 begins at block 402 where, for example, the data collection system 132 accesses data from one or more of the internal data sources 120 and the external data sources 122. The data collection system 132 may use the collection engine 202 to access the data. Further, the block 402 can include some or all of the embodiments described above with respect to the blocks 302 and 304. Moreover, some or all of the process 300 described above can be performed as part of the process performed at block 402. In some embodiments, the process 400 can be performed as part of the block 312 above. In such embodiments, the block 402 may include the data collection system 132 providing the data, a reformatted version of the data, an abstraction of the data, and/or metadata to the data classification system 134. In some implementations, the process 400 may be performed separately or independently of the data collection process. In such embodiments, the block 402 may include accessing the data from the databases 232. In some cases, the databases 232 may include a database for classified data and a separate database for data that has not yet been classified.

At block 404, the a priori classification engine 226 classifies the data based on a set of user-specified classification rules. As previously mentioned, a developer of the BIM system 130 or a user (e.g., an administrator) may specify the classification rules. Further, the classification rules can include any rules for classifying data based on the data or metadata associated with the data. For example, data may be classified based on the author of the data, the owner of the data, the time the data was created, etc.

At block 406, the a posteriori classification engine 228 classifies the data using a posteriori analysis. This may include the a posteriori classification engine 228 using one or more probabilistic algorithms to determine one or more classifications for the data. The a posteriori classification engine 228 can use any type of probabilistic algorithm for classifying the data. For example, the classification may be based on one or more Bayesian probability algorithms. As another example, the a posteriori classification may be based on clustering of similar or dissimilar pieces of data. One example of such an approach that can be adapted for use herein is the Braun-Blanquet method that is sometimes used in vegetation science. One or both of the a priori classification and the a posteriori classification may be based on one or more variables or criteria associated with the data or metadata.

In some embodiments, the a posteriori classification engine 228 may use the heuristics engine 230 to facilitate calculating the probabilistic classifications of the data. For example, the a posteriori classification engine 228 can modify the probabilities used to classify the data based on a determination of the heuristics engine 230 of the accuracy of the classification of previously classified data. The heuristics engine 230 may determine the accuracy of the classification of previously classified data based on, for example, feedback by the user. This feedback may include, for example, manual reclassification of data, indications by a user of the accuracy of prior classifications, indications of the accuracy or usefulness of query results from querying the databases 232 that include the classified data, etc. Further, the heuristics engine 230 may determine the accuracy of the classification of previously classified data based on, for example, the classifications of data accessed more recently than the previously classified data. In some cases, the more recent data may have been accessed before or at the same time as the previously classified data, but may be classified after the previously classified data.

At block 408, the heuristics engine 230 can classify data using a heuristics analysis. As previously described, in some cases, the heuristics engine 230 can classify the data based on the number or percentage of characteristics or attributes associated with the data that match a particular classification.

In some embodiments, the task scheduler 224 schedules one or more of the blocks 404, 406, and 408. Further, in some cases, the task scheduler 224 may determine whether to perform the process 400 and/or one or more of the blocks 404, 406, and 408. In some cases, one or more of the blocks 404, 406, and 408 may be optional. For instance, an initial classification may be associated with data when it is collected via the process associated with the block 404. The data may then be further classified or reclassified at collection, or at a later time, using the process associated with the block 406, the block 408, or a combination of the blocks 406 and 408.

At block 410, the data repository engine 222 stores or causes to be stored the data and the data classifications at the databases 232. In some cases, the data repository engine 222 may store metadata associated with the data at the databases 232 instead of, or in addition to, storing the data.

At block 412, the data repository engine 222 can update the a posteriori algorithms based on the classifications determined for the data. In addition, or alternatively, the a posteriori algorithms may be updated based on previously classified data. The a posteriori algorithms may be updated based on customer feedback and/or the determination of the heuristics engine 230 as described above with respect to the block 406. Further, updating the a posteriori algorithms may include modifying the probabilistic weights applied to one or more variables or pieces of metadata used to determine the one or more classifications of the data. Moreover, updating the a posteriori algorithms may include modifying the one or more variables or pieces of metadata used to determine the one or more classifications of the data. In some cases, the block 412 can include modifying the heuristic algorithms used at the block 408. For example, the number of characteristics required to classify the data with a particular classification may be modified. In addition, or alternatively, the weight applied to each of the characteristics may be modified at the block 412.

As with the process 300, it is possible for the operations of the process 400 to be performed in a different order or in parallel. For example, the blocks 404 and 406 may be performed in a different order or in parallel.

Figure 5:
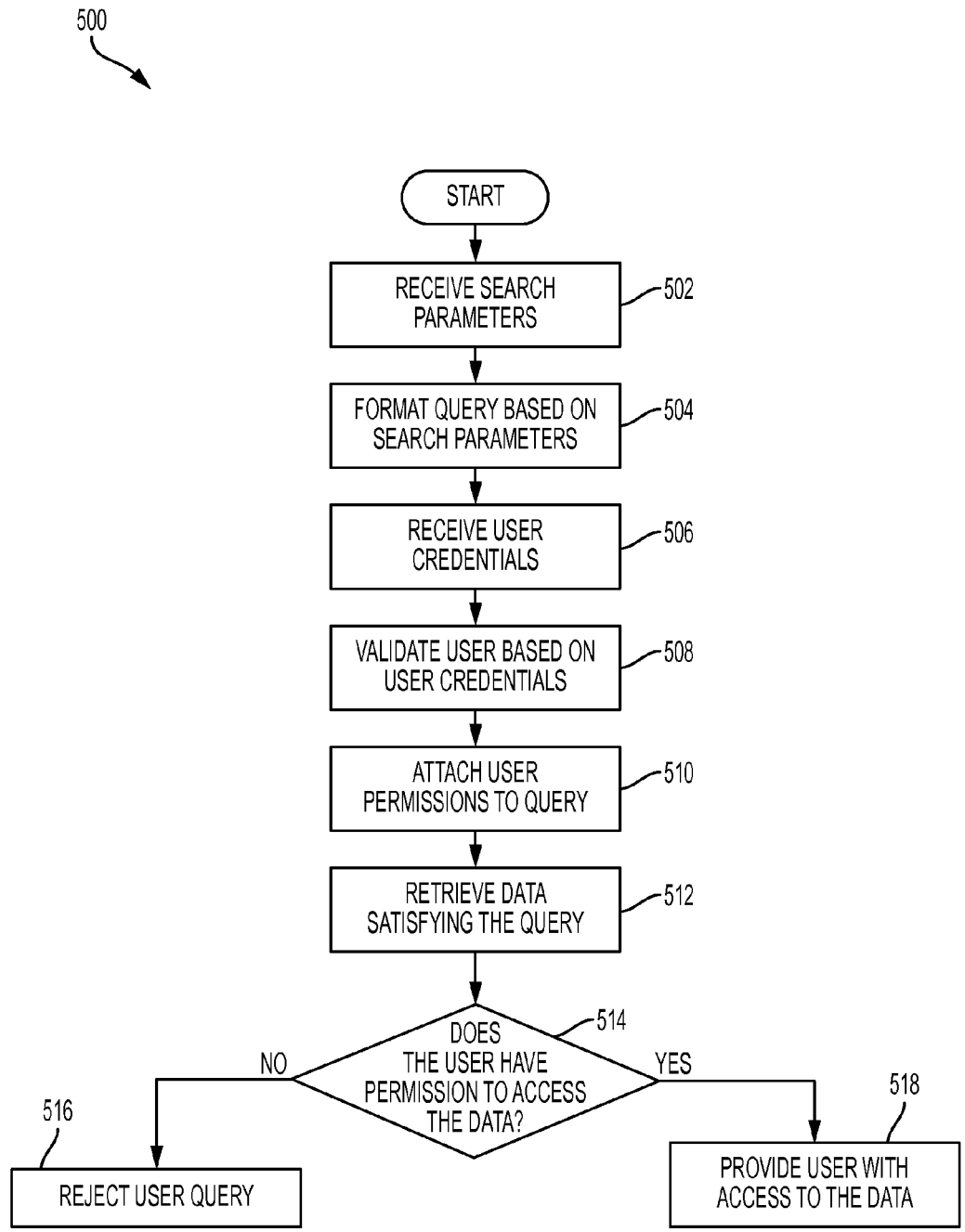
FIG. 5 illustrates an example of a data query process.

FIG. 5 presents a flowchart of an example of a data query process 500. The process 500 can be implemented by any system that can process a query provided by a user or another system and cause the results of the query to be presented to the user or provided to the other system. For example, the process 500, in whole or in part, can be implemented by one or more of the BIM access system 136, the user interface 240, the query manager 242, and the query security manager 244. In some cases, the process 500 can be performed generally by the BIM system 130. Although any number of systems, in whole or in part, can implement the process 500, to simplify discussion, the process 500 will be described in relation to specific systems or subsystems of the BIM system 130.

The process 500 begins at block 502 where, for example, the user interface 240 receives a set of one or more search parameters from a user via a client (e.g., the client 114). In some embodiments, the search parameters may be provided by another computing system. For example, in some embodiments, an application running on a server (not shown) or a client (e.g., the client 116) may be configured to query the BIM system 130 in response to an event or at a predetermined time. The application can then use the result of the query to perform an application-specific process. For instance, an application or script may be configured to query the BIM system 130 every month to determine the workload of each employee or the employees in a specific department of an organization to determine, for example, whether additional employees are needed or whether the allocation of human resources within different departments should be redistributed. In this example, the application can determine whether to alert a user based on the result of the determination.

In some implementations, a user can provide a text-based query to the user interface 240. This text-based query can be parsed by, for example, the user interface 240 and/or the query manager 242. Alternatively, or in addition, the user interface 240 can provide a set of query options and/or fields that a user can use to formulate a query of the BIM system 130. The query options or fields can include any type of option or field that can be used to form a query of the BIM system 130. For example, the query options or fields can include tags, classifications, time ranges, keywords, user identifiers, user roles, customer identifiers, vendor identifiers, corporate locations, geographic locations, etc. In some embodiments, the query options and/or search fields presented to a user may be generated based on the data stored in the databases 232. For example, if the databases 232 includes email data, a sender field and a recipient field may be available for generating a query. However, if the databases 232 lacks any email data, the sender and recipient fields may not be available for generating a query.

In some cases, the query security manager 244 can limit or determine the fields or options that the user interface 240 can present to the user based on, for example, the user's permissions or the user's role. For example, fields relating to querying the BIM system 130 regarding the content of a business's email may be unavailable to a user who is not authorized to search the contents of collected email. For instance, searching the content of emails may be limited to the legal department for compliance purposes. Other users may be prohibited from searching the email content for privacy reasons.

At block 504, the query manager 242 formats a query based on the search parameters received at block 502. Formatting the query may include transforming the search parameters and query options provided by the user into a form that can be processed by the data repository engine 222. In certain embodiments, the block 504 may be optional. For example, in some cases the search parameters may be provided by the user in a form of a query that can be processed by the BIM system 130 without modification.

At block 506, the user interface 240 receives one or more user credentials from the user. In some cases, the user credentials may be received from an application. The user credentials can include any type of credential or identifier that can be used to identify a user and/or determine a set of permissions or a level of authorization associated with the user. At block 508, the query security manager 244 can validate the user, or application, based at least in part on the user credentials received at the user interface 240. Validating the user can include identifying the user, identifying permissions associated with the user, the user's role, and/or an authorization level associated with the user. In some embodiments, if the query security manager 244 is unable to validate the user or determines that the user lacks authorization to access the BIM system 130 and/or query the databases 232, the query security manager 244 may reject the user's query. Further, the user interface 240 may inform the user that the user is not authorized to access the BIM system 130 or to query the databases 232. In some implementations, if the user identifies as a guest or if the query security manager 244 is unable to validate the guest, the user may be associated with a guest identity and/or a set of guest permissions, which may permit limited access to the BIM system 130 or the data stored at the databases 232. In some cases, a guest may receive full access to the BIM system 130. However, the actions of the guest may be logged or logged differently than the actions of an identified user.

At block 510, the query security manager 244 attaches the user permissions to the query. Alternatively, or in addition, the query security manager may attach the user's identity, role, and/or authorization level to the query. In some embodiments, one or more of the blocks 506, 508, and 510 may be optional.

At block 512, the query manager 242 retrieves data, and/or metadata, satisfying the query. In some implementations, the block 512 may include providing the query to the data repository engine 222 for processing. The data repository engine 222 can then query the databases 232 to obtain data that satisfies the query. This data can then be provided to the query manager 242.

At decision block 514, the query security manager 244 can determine whether the user has permission, or is authorized, to access the data that satisfies the query. Determining whether the user has permission to access the data may be based on any type of factor that can be used to determine whether a user can access data. For example, the determination may be based, at least in part, on the user's credentials, the user's permissions, a security level associated with the data, etc. In some cases, the data repository engine 222 may perform the decision block 514 as part of the process associated with the block 512.

If the query security manager 244 determines that the user does not have permission to access the data, the query security manager 244 rejects the user query at block 516. In some cases, rejecting the user query may include informing the user that the query is not authorized and/or that the user is not authorized to access the data associated with the query. In other cases, rejecting the user query may include doing nothing or presenting an indication to the user that no data satisfies the user's query.

If the query security manager 244 determines that the user does have permission to access the data, the user interface 240 provides the user with access to the data at block 518. Providing the user with access to the data can include presenting the data on a webpage, in an application-generated window, in a file, in an email, or any other method for providing data to a user. In some cases, the data may be copied to a file and the user may be informed that the data is ready for access by, for example, providing the user with a copy of the file, a link to the file, or a location associated with the file.

With some queries, a user may be authorized to access some data that satisfies the query, but not other data that satisfies the query. In such cases, the user may be presented with the data that the user is authorized to access. Further, the user may be informed that additional data exists that was not provided because, for example, the user was not authorized to access the data. In other cases, the user may not be informed that additional data exists that was not provided.

In some embodiments, the decision block 514 and block 516 may be optional. For example, in some cases where the search parameters available to a user are based on the user's permissions, decision block 514 may be superfluous. However, in other embodiments, both the search parameters available to the user and the data the user can access are independently determined based on the user's permissions.

Advantageously, in certain embodiments, the process 500 can be used to identify new information and/or to determine trends that would be more difficult or identify or not possible to identify based on a single data source. For example, the process 500 can be used to identify the most productive and least productive employees of an organization based on a variety of metrics. Examining a single data source may not provide this information because employees serve different roles. Further, different employees are unproductive in different ways. For example, some employees may spend time an inordinate amount of time on social networking sites or emailing friends. Other employees may procrastinate by playing games or by talking in the kitchen. Thus, examining only email use or Internet activity may not provide an accurate determination of which employees are more productive. In addition, some employees can accomplish more work in less time than other employees. Thus, to determine which employees are the most productive during working hours requires examining a number of data sources. The BIM system 130 makes this possible by enabling a user to generate a query that relates the amount of time in the office to the amount of time spent procrastinating at different types of activities to the number of work-related tasks that are accomplished.

As a second example, the BIM system 130 can be used to identify the salespersons and the communications techniques that are most effective for each customer. For instance, a user can generate a query that relates sales, the method of communication, the content of communication, the salespersons contacting each of the customers, and the customers. Based on the result of this query, a manager may be able to determine that certain salespersons generate larger sales when using a particular communication method with a particular customer while other salespersons may be more effective with a different communication method with the particular customer or may be more effective with other customers.

An additional example of an application of the BIM system 130 can include gauging employee reaction to an executive memorandum or a reorganization announcement. Queries can be generated to access all communications associated with the memorandum or announcement. Alternatively, or in addition, queries can be generated to identify the general mood of employees post memorandum or announcement. These queries can examine the tone of emails and other communications (e.g., social networking posts, etc.). Additional examples of applications for using the BIM system 130 can include determining whether employees are communicating with external sources in a manner that adheres to corporate policies, communicating with customers in a timely fashion, or accessing data that is unrelated to their job role.

Figure 6:
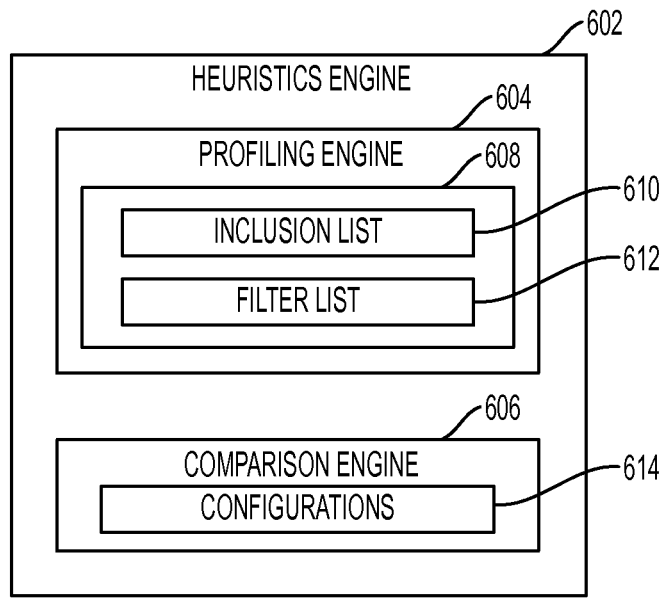
FIG. 6 illustrates an example of a heuristics engine.

FIG. 6 illustrates an example of a heuristics engine 602. In a typical embodiment, the heuristics engine 602 operates as described with respect to the heuristics engine 230 of FIG. 2. In a typical embodiment, the heuristics engine 602 is operable to perform a heuristics analysis for each of a plurality of different classifications and thereby reach a classification result for each classification. The classification result may be, for example, an indication whether a given classification should be assigned to given data. For purposes of simplicity, the heuristics engine 602 may be periodically described, by way of example, with respect to a single classification.

The heuristics engine 602 includes a profiling engine 604 and a comparison engine 606. In a typical embodiment, the profiling engine 604 is operable to develop one or more profiles 608 by performing, for example, a multivariate analysis. For example, in certain embodiments, the one or more profiles 608 may relate to what constitutes a personal message. In these embodiments, the profiling engine 604 can perform a multivariate analysis of communications known to be personal messages in order to develop the one or more profiles 608. In some embodiments, the one or more profiles 608 can also be manually established.

In typical embodiment, the one or more profiles 608 can each include an inclusion list 610 and a filter list 612. The inclusion list 610 can include a list of tokens such as, for example, words, that have been determined to be associated with the classification to which the profile corresponds (e.g., personal message, business message, etc.). In a typical embodiment, for each token in the inclusion list 610, the appearance of the token in a communication makes it more likely that the communication should be assigned the classification. The filter list 612 can include a list of tokens such as, for example, words, that have been determined to have little to no bearing on whether a given communication should be assigned the classification. In some embodiments, the filter list 612 may be common across all classifications.

In certain embodiments, the inclusion list 610 may be associated with statistical data that is maintained by the profiling engine 604. Based on the statistical data, the one or more profiles 608 can provide means, or expected values, relative to the inclusion list 610. In some embodiments, the expected value may be based on an input such as a length of a given communication (e.g., a number of characters or words). According to this example, the expected value may be an expected number of "hits" on the inclusion list 610 for a personal message of a particular length. The particular length may correspond to a length of the given communication. By way of further example, the expected value may be an expected percentage of words of a personal message that are "hits" on the inclusion list 610. Optionally, the expected percentage may be based on a length of the given communication in similar fashion to that described above with respect to the expected number of "hits."

The comparison engine 606 is operable to compare data to the one or more profiles 108 based on configurations 614. The configurations 614 typically include heuristics for establishing whether data should be classified into the classification. In particular, the configurations 614 can include one or more thresholds that are established relative to the statistical data maintained by the profiling engine 604. For example, each threshold can be established as a number of standard deviations relative to an expected value.

For example, continuing the personal-message classification example described above, the configurations 614 may require that an actual value of a given metric for a new communication not be more than two standard deviations below the expected value of the given metric. In this fashion, if the actual value is not more than two standard deviations below the expected value, the new communication may be assigned the classification. The given metric may be, for example, a number or percentage of "hits" as described above.

Figure 7:
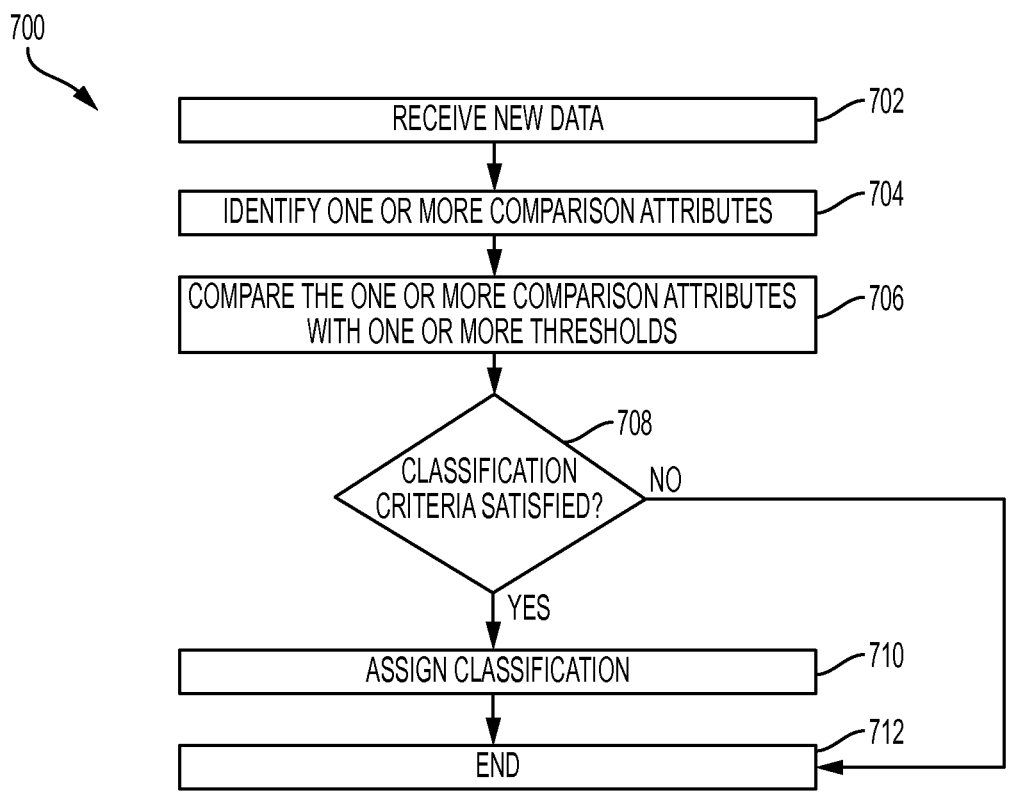
FIG. 7 illustrates an example of a heuristics process.

FIG. 7 presents a flowchart of an example of a heuristics process 700 for classifying data into a classification. The process 700 can be implemented by any system that can classify data and/or metadata. For example, the process 700, in whole or in part, can be implemented by a heuristics engine such as, for example, the heuristics engine 230 of FIG. 2 or the heuristics engine 602 of FIG. 6. In some cases, the process 700 can be performed generally by the BIM system 130. Although any number of systems, in whole or in part, can implement the process 700, to simplify discussion, the process 700 will be described in relation to the heuristics engine. The process 700 begins at step 702.

At step 702, the heuristics engine receives new data. The new data may be considered to be representative of any data, inclusive of metadata, for which classification is desired. The new data may be, for example, a new communication. From step 702, the process 700 proceeds to step 704. At step 704, the heuristics engine identifies one or more comparison attributes in the new data. For example, the one or more comparison attributes may be actual values for given metrics such as, for example, a number or percentage of "hits" on an inclusion list such as the inclusion list 610 of FIG. 6. From step 704, the process 700 proceeds to step 706.

At step 706, the heuristics engine compares the one or more comparison attributes with one or more thresholds. The one or more thresholds may be defined as part of configurations such as, for example, the configurations 614 of FIG. 6. From step 706, the process 700 proceeds to step 708. At step 708, the heuristics engine determines whether classification criteria has been satisfied. In a typical embodiment, the classification criteria is representative of criteria for determining whether the new data should be assigned the classification. The classification criteria may specify, for example, that all or a particular combination of the one or more thresholds be satisfied.

If it is determined at step 708 that the classification criteria not been satisfied, the process 700 proceeds to step 712 where the process 700 ends without the new data being assigned the classification. If it is determined at step 708 that the classification criteria has been satisfied, the process 700 proceeds to step 710. At step 710, the heuristics engine assigns the classification to the new data. From step 710, the process 700 proceeds to step 712. At step 712, the process 700 ends.

In certain embodiments, data queries as described with respect to FIGS. 1-5 may also be accomplished using query packages. A query package generally encapsulates package attributes such as, for example, search parameters as described above with respect to queries, as long with other package attributes that enable enhanced functionality. For example, a query package can further encapsulate a package attribute that specifies a type of data visualization that is to be created using the queried data. The type of data visualization can include, for example, scatterplots, pie charts, tables, bar charts, geospatial representations, heat maps, chord charts, interactive graphs, bubble charts, candlestick charts, stoplight charts, spring graphs, and/or other types of charts, graphs, or manners of displaying data.

In some embodiments, query packages may run one specific query. In various other embodiments, query packages may run multiple queries. Table 1 below lists example package attributes that can be included in a given query package.

TABLE 1

| PACKAGE ATTRIBUTE(S) | DESCRIPTION |
|---|---|
| Package Name | A name by which the query package can be referenced. |
| Package Description | A description of the query package's operation. |
| Security Scope | Optionally specify a security and data access policy as described with respect to FIG. 2. |
| Visualization | Specifies a type of data visualization such as, for example, scatterplots, pie charts, tables, bar charts, geospatial representations, heat maps, chord charts, interactive graphs, bubble charts, candlestick charts, stoplight charts, spring graphs, and/or other types of charts, graphs, or manners of displaying data. |

TABLE 1-continued

| PACKAGE ATTRIBUTE(S) | DESCRIPTION |
|---|---|
| | In cases where the package is representative of multiple queries, the visualization attribute may be represented as an array of visualizations that can each have a visualization type, a data source, and a target entity (e.g., entity that is being counted such as, for example, messages, message participants, etc.) |
| Default Group-By Field | Retrieves data according to, for example, one or more data columns (e.g., by location, department, etc.). |
| Aggregation Period | A time period such as, for example, daily, hourly, etc. |
| Data-Smoothing Attributes | Specifies one or more algorithms that attempt to capture important patterns in the data, while leaving out noise or other fine-scale structures/rapid phenomena. |
| Visualization-Specific Attributes | Certain types of visualizations may require additional attributes such as, for example, specification of settings for sorting, number of elements in a data series, etc. |
| Facet Names | Data (or fields) related to the query that can be used to categorize data. Particular values of facets can be used, for example, to constrain query results. |
| Array of Entities | An array of entities that can each have, for example, a name, entity type (e.g., message), filter expression, and a parent-entity property. |
| Array of Facets | An array of facets that can each have, for example, a name, group-by field, and a minimum/maximum number of results to show. |

In a typical embodiment, query packages can be shared among users or distributed to users, for example, by an administrator. In a typical embodiment, one user may share a particular query package with another user or group of users via the user interface 240. In similar fashion the other user or group of users can accept the query package via the user interface 240. Therefore, the query manager 242 can add the shared query package for the user or group of users. As described above, the query manager 242 generally maintains each user's query packages in a table by a unique identifier. In a typical embodiment, query packages further facilitate sharing by specifying data and data sources in a relative fashion that is, for example, relative to a user running the query. For example, package attributes can refer to data owned by a user running the query or to data that is owned by users under the supervision of the user running the query rather than to specific data or users.

Figure 8:
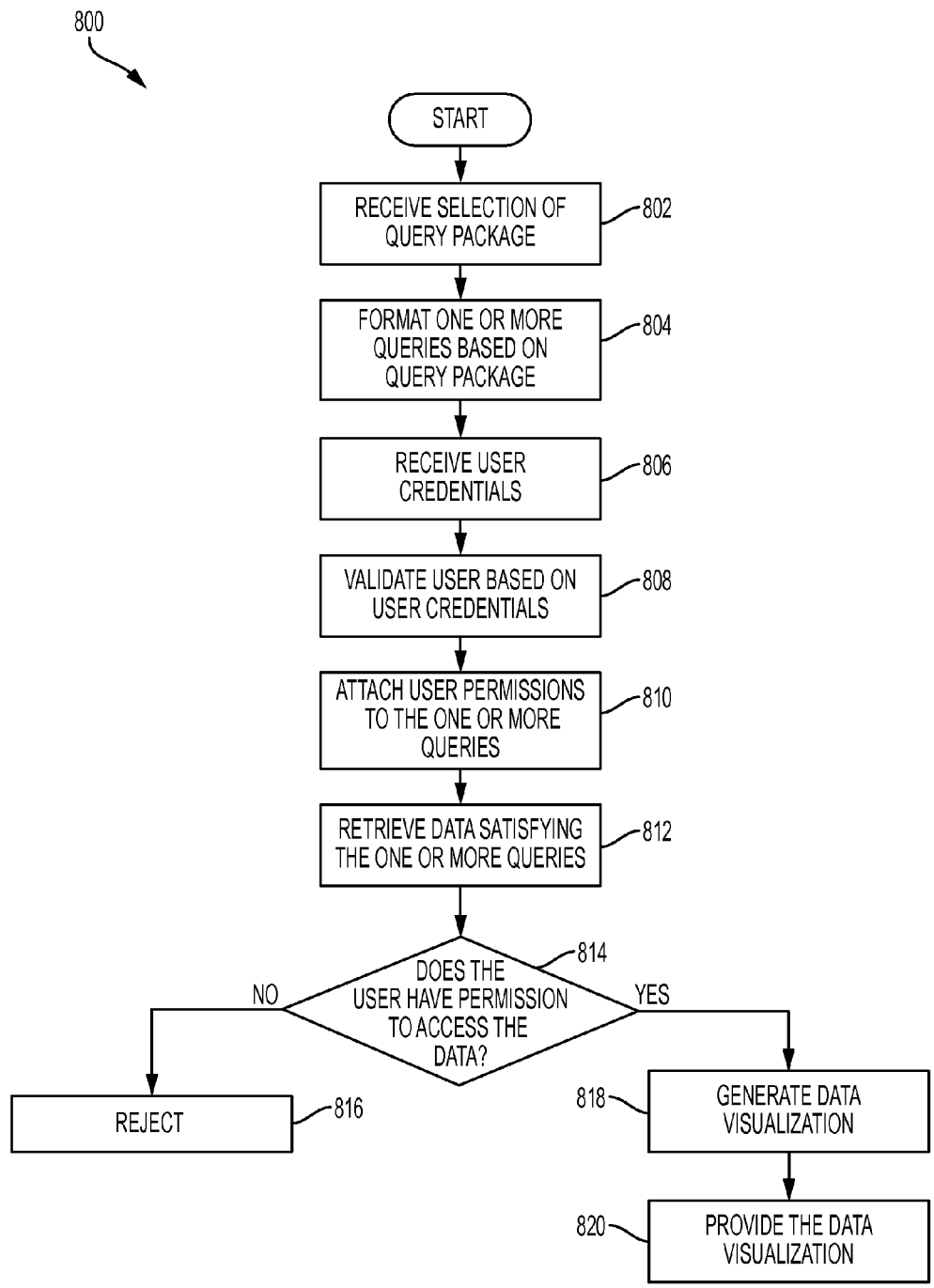
FIG. 8 illustrates an example of a data query process.

FIG. 8 presents a flowchart of an example of a data query process 800 that uses query packages. The process 800 can be implemented by any system that can process a query package provided by a user or another system and cause the results of a query encapsulated therein to be presented to the user or provided to the other system. For example, the process 800, in whole or in part, can be implemented by one or more of the BIM access system 136, the user interface 240, the query manager 242, and the query security manager 244. In some cases, the process 800 can be performed generally by the BIM system 130. Although any number of systems, in whole or in part, can implement the process 800, to simplify discussion, the process 800 will be described in relation to specific systems or subsystems of the BIM system 130.

The process 800 begins at block 802 where, for example, the user interface 240 from a user a selection of a query package. In various embodiments, the query package may be selected from a list or graphical representation of query packages. As described above, the query package typically specifies a data visualization based on a data query. In various embodiments, the query package may specify more than one data visualization and/or be based on more than one data query. At block 804, the query manager 242 formats one or more queries based on the query package selected at block 802. In certain embodiments, the block 804 may be optional. For example, in some cases the query package may already include a query that can be processed by the BIM system 130 without modification.

At block 806, the user interface 240 receives one or more user credentials from the user. In some cases, the user credentials may be received from an application. The user credentials can include any type of credential or identifier that can be used to identify a user and/or determine a set of permissions or a level of authorization associated with the user. At block 808, the query security manager 244 can validate the user, or application, based at least in part on the user credentials received at the user interface 240. Validating the user can include identifying the user, identifying permissions associated with the user, the user's role, and/or an authorization level associated with the user. In some embodiments, if the query security manager 244 is unable to validate the user or determines that the user lacks authorization to access the BIM system 130 and/or query the databases 232, the query security manager 244 may reject the one or more queries. Further, the user interface 240 may inform the user that the user is not authorized to access the BIM system 130 or to query the databases 232. In some implementations, if the user identifies as a guest or if the query security manager 244 is unable to validate the guest, the user may be associated with a guest identity and/or a set of guest permissions, which may permit limited access to the BIM system 130 or the data stored at the databases 232. In some cases, a guest may receive full access to the BIM system 130. However, the actions of the guest may be logged or logged differently than the actions of an identified user.

At block 810, the query security manager 244 attaches the user permissions to the one or more queries. Alternatively, or in addition, the query security manager may attach the user's identity, role, and/or authorization level to the one or more queries. In some embodiments, one or more of the blocks 806, 808, and 810 may be optional.

At block 812, the query manager 242 retrieves data, and/or metadata, satisfying the one or more queries. In some implementations, the block 812 may include providing the one or more queries to the data repository engine 222 for processing. The data repository engine 222 can then query the databases 232 to obtain data that satisfies the one or more queries. This data can then be provided to the query manager 242.

At decision block 814, the query security manager 244 can determine whether the user has permission, or is authorized, to access the data that satisfies the one or more queries. Determining whether the user has permission to access the data may be based on any type of factor that can be used to determine whether a user can access data. For example, the determination may be based, at least in part, on the user's credentials, the user's permissions, a security level associated with the data, etc. In some cases, the data repository engine 222 may perform the decision block 814 as part of the process associated with the block 812.

If the query security manager 244 determines that the user does not have permission to access the data, the query security manager 244 rejects the one or more queries at block 816. In some cases, rejecting the one or more queries may include informing the user that the query package not authorized and/or that the user is not authorized to access the data associated with the query package. In other cases, rejecting the one or more queries may include doing nothing or presenting an indication to the user that no data satisfies the query package.

If the query security manager 244 determines that the user does have permission to access the data, the query manager 242 (or a separate visualization component) generates the data visualization at block 818. At block 820, the user interface 240 provides the data visualization to the user. Providing the user the data visualization can include presenting the data visualization on a webpage, in an application-generated window, in a file, in an email, or any other method for providing data to a user. In some cases, the data visualization may be copied to a file and the user may be informed that the data visualization is ready for access by, for example, providing the user with a copy of the file, a link to the file, or a location associated with the file.

FIG. 9 illustrates an example of a user interface that can be used by a user to select a query package.

FIG. 10 illustrates an example of a user interface that can be used by a user to create or modify a query package.

Table 2 below provides an example of a data model that can be utilized by a BIM system such as, for example, the BIM system 130. In particular, Table 2 illustrates several entities that can be used to model communications such as, for example, personal communications or business communications.

TABLE 2

| ENTITY | FIELD | DATA TYPE |
|---|---|---|
| Message | Body | String |
| | Classifications | Strings |
| | Content | String |
| | Date | Date Time |
| | External Recipients | Entities (Message Participant) |
| | File Attachments | Entities (File) |
| | In reply to | Entity (Message) |
| | Internal Recipients | Entities (Message Participant) |
| | Is Encrypted | Boolean |
| | Message Attachments | Entities (Messages) |
| | Message IDs | Strings |
| | Original Message ID | String |
| | Participants | Entities (Message Participant) |
| | Platform | Enum (Message Platform type) |
| | Recipients | Entities (Message Participant) |
| | Send Date | Date Time |
| | Send Time of Day | Time |
| | Sender | Entity (Message Participant) |
| | Size | Integer |
| | Subject | String |
| | Thread | Entity (Message Thread) |
| | Type | Enum (Message Address Type) |
| Message Participant | Date | Date Time |
| | Deletion Date | Date Time |
| | Delivery Time | Time Span |
| | Has Been Delivered | Boolean |
| | ID | String |
| | Is Addressed in BCC | Boolean |
| | Is Addressed in CC | Boolean |
| | Is Addressed in TO | Boolean |
| | Is External Recipient | Boolean |
| | Is Internal Recipient | Boolean |
| | Is Recipient | Boolean |
| | Is Sender | Boolean |
| | MessgeAsSender | Entity (Message) |
| | MessageAsInternalRecipient | Entity (Message) |
| | MessageAsExternalRecipient | Entity (Message) |
| | Message Address | Entity (Message Address) |
| | Person | Entity (Person Snapshot) |
| | Receipt Date | Date Time |
| | Receipt Time of Day | Time |

TABLE 2-continued

| ENTITY | FIELD | DATA TYPE |
|---|---|---|
| | Responses | Entity (Message) |
| | Response Time | Time Span |
| Message Address | Domain | Entity (ONS Domain) |
| | Is External | Boolean |
| | Is Internal | Boolean |
| | Name | String |
| | Platform | Enum (Message Platform Type) |
| | Type | Enum (Message Address Type) |
| DNS Domain | Name | String |
| | Address | Entities (Messaging Address) |
| Person Snapshot | All Reports | Entities (Person Snapshot) |
| | Company | String |
| | Department | String |
| | Direct Reports | Entities (Person Snapshot) |
| | First Name | String |
| | Full Name | String |
| | History | Entity (Person History) |
| | ID | String |
| | Initials | String |
| | Job Title | String |
| | Last Name | String |
| | Manager | Entity (Person Snapshot) |
| | Managers | Entities (Person Snapshot) |
| | Messaging Addresses | Entities (Message Address) |
| | Message Participants | |
| | Office | String |
| | OU | String |
| | Snapshot Date | Date Time |
| | Street Address | Complex Type (Street Address) |
| | Telephone Numbers | Strings |
| Street Address | City | String |
| | Country or Region | String |
| | PO Box | String |
| | State or Province | String |
| | Street | String |
| | Zip or Postal Code | String |
| Person History | Current | Entity (Person) |
| | Historic | Entities (Person) |
| | ID | String |
| | Messages | Entities (Message) |
| | Timestamp | Date Time |
| Message Thread | ID | String |
| | Messages | Entities (Message) |
| | Participants | Entities (Message Participant |
| | Thread subject | String |
| | Timestamp | Date Time |
| File | Filename | String |
| | ID | String |
| | Messages | Entities (Message) |
| | Modified Date | Date Time |
| | Size | Integer |
| | Hash | String |

III. Example Operation of a Content-Exposure Analysis System

Figure 11:
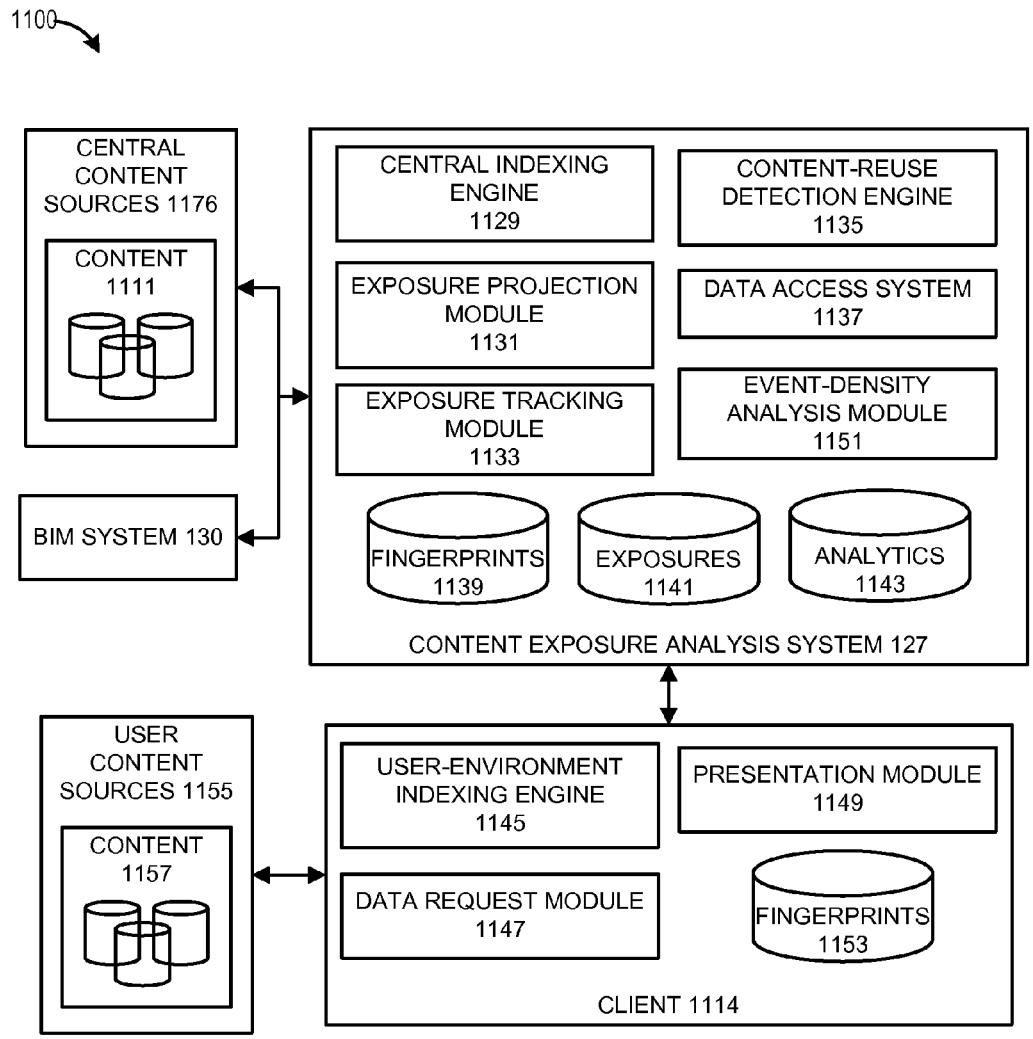
FIG. 11 illustrates an embodiment of a system for analyzing content exposure.

FIG. 11 illustrates an embodiment of a system 1100 for analyzing content exposure. The system 1100 includes the content-exposure analysis system 127, the BIM system 130, central content sources 1176, a client 1114, and user content sources 1155. As described in greater detail below, the content-exposure analysis system 127 can interact with the client 1114 to anticipate and monitor exposure events initiated on the client 1114.

The client 1114 can operate as described, for example, with respect to the client 114, the client 116, and/or the client 116 of FIG. 1. In some embodiments, the client 1114 can be representative of a virtual desktop provisioned by a component of the computing environment 102 or by a component of another environment or system. Although the client 1114 is shown singly for simplicity of illustration and description, it should be appreciated that, in various embodiments, the content-exposure analysis system 127 can interact with a plurality of clients similar to the client 1114.

In general, the central content sources 1176 can include, for example, systems that allow publishing, editing, modifying, transmitting and/or maintaining of content. As illustrated, the central content sources 1176 can store or maintain central content 1111 as part of their operation. The central content 1111 can include, for example, documents, presentations, media (e.g., audio, video, images, etc.), communications, text strings, combinations of same and/or the like. The central content sources 1176, in general, are representative of at least a portion of the internal data sources 120 and the external data sources 122 as illustrated in FIG. 1. For ease of illustration and description, those of the internal data sources 120 and the external data sources 122 that can serve as a content source are shown collectively as the central content sources 1176.

In the illustrated embodiment, the content-exposure analysis system 127 includes a central indexing engine 1129, an exposure projection module 1131, an exposure tracking module 1133, a content-reuse detection engine 1135, a data access system 1137, and an event-density analysis module 1151. As shown, the client 1114 can include a user-environment indexing engine 1145, a data request module 1147, and a presentation module 1149.

The central indexing engine 1129 can be a hardware and/or software module operable to generate and index fingerprints of some or all content items in the central content 1111. In some embodiments, the central indexing engine 1129 can access the central content 1111 directly via the central content sources 1176. In addition, or alternatively, the central indexing engine 1129 can access the central content 1111 through the BIM system 130. For example, in some cases, the central indexing engine 1129 can access the central content 1111 via the access manager 204. By way of further example, in other cases, the central indexing engine 1129 can access the central content 1111 as data that is collected, for example, by the data collection system 132.

In certain embodiments, the central indexing engine 1129 can extract substrings, or n-grams, from some or all content items of the central content 1111. In some cases, the substrings can be extracted at one or more configurable levels of granularity such as, for example, words, phrases, sentences, etc. Thereafter, the central indexing engine 1129 can generate a fingerprint of each substring using, for example, Rabin's fingerprinting algorithm, a cryptographic hash function (e.g., MD5, SHA, etc.), combinations of same and/or the like. In some embodiments, the central indexing engine 1129 can use built-in fingerprinting functionality of one or more of the central content sources 1176. The fingerprint of a given content item can be considered, for example, a combination of its substring fingerprints.

In certain embodiments, for each content item that is fingerprinted, corresponding substring fingerprints can be stored in a central fingerprint repository 1139. In addition, content metadata can be extracted from the content items and stored with the substring fingerprints. The content metadata can include, for example, a title, timing information, an author of the content item, an organization associated with the content item, etc. The timing information can indicate a date and time of a last edit of a given content item, a date and time of creation of a given content item, a date and time of transmission of a given content item, combinations of same and/or the like. Example operation of the central indexing engine 1129 will be described with respect to FIG. 12.

The exposure projection module 1131 can be a hardware and/or software module operable to process user-initiated precursors of exposure events. An exposure event can be, for example, an event whose occurrence would result in content being exposed to one or more additional users. A user-initiated precursor of an exposure event can be, for example, a user action that frequently precedes an exposure event. In many cases, the user action may be a prerequisite to the occurrence of a given exposure event. In an example, for an exposure event of emailing particular content to one or more recipients, a precursor of the exposure event could be entry by a user of one or more recipients into an appropriate field (e.g., a TO field, a CC field, a BCC field, etc.). In certain embodiments, the exposure projection module 1131 can be used to project a scope of exposure (e.g., one or more users) for an anticipated exposure event.

In some cases, the exposure projection module 1131 can detect user-initiated precursors of exposure events, for example, by monitoring communications platforms that may be included among the central content sources 1176. In still other cases, the exposure projection module 1131 can receive notifications of user-initiated precursors of exposure events that are detected, for example, on the client 1114. In these cases, the exposure projection module 1131 can further receive information related to the user-initiated precursor such as, for example, a communication which would constitute the exposure event. Example operation of the exposure projection module 1131 will be described in greater detail with respect to FIG. 14.

The exposure tracking module 1133 can be a hardware and/or software module operable to detect the occurrence of exposure events. In certain embodiments, once a given exposure event occurs relative to particular content, the exposure tracking module 1133 can further track, across communications platforms, follow-on exposure events which chain from the exposure event. In general, follow-on exposure events can be additional exposure events that directly result from an original exposure event. Consider an example of user A emailing particular content to user B. According to this example, follow-on exposure events could include user B forwarding the particular content to users C, D and E, user E forwarding the particular content to user group F, etc. Information related to exposure events that are detected can be stored in an exposures repository 1141. Example operation of the exposure tracking module 1133 will be described in greater detail with respect to FIG. 15.

The content-reuse detection engine 1135 can be a hardware and/or software module operable to compare one or more content fingerprints with content fingerprints of the central fingerprint repository 1139. Based thereon, the content-reuse detection engine 1135 can identify reuses of particular content by users. In certain embodiments, the content-reuse detection engine 1135 can generate various analytics related to uses/re-uses of particular content such as, for example, which user is associated with an earliest use of the particular content. In certain embodiments, data generated by the content-reuse detection engine 1135 can be stored in an analytics repository 1143. Example operation of the content-reuse detection engine 1135 will be described in greater detail with respect to FIG. 16.

The event-density analysis module 1151 can be a hardware and/or software module operable to analyze a density, or concentration, of exposure events for a variable of interest such as, for example, time. Example operation of the event-density analysis module 1151 will be described in greater detail with respect to FIG. 17. The data access system 1137 can be a hardware and/or software module operable to interact with the client 1114 to provide information generated or stored by the content-exposure analysis system 127.

Example operation of the data access system 1137 will be described in greater detail with respect to FIG. 18. In some embodiments, the event-density analysis module 1151 can be on the client 1114 rather than on the content-exposure analysis system 127 as illustrated.

Referring now more specifically to the client 1114, the user content sources 1155 can include, for example, user-accessible resources that allow storing, publishing, editing, modifying, transmitting and/or maintaining of content. The user content sources 1155 can include storage or memory accessible in a user environment on the client 1114 such as, for example, local drives, network drives, cloud drives, etc. As illustrated, the user content sources 1155 can store or maintain user content 1157 as part of their operation.

In certain embodiments, the user-environment indexing engine 1145 can be a hardware and/or software module operable to generate and index fingerprints of some or all content items in the user content 1157 using a methodology similar to that which is described above relative to the central indexing engine 1129. In certain embodiments, for each content item that is fingerprinted, corresponding substring fingerprints can be stored in a user fingerprint repository 1153. In similar fashion to that which is described above relative to the central indexing engine 1129, content metadata can be extracted from the content items and stored with the sub string fingerprints in the user fingerprint repository 1153.

In addition, or alternatively, the user-environment indexing engine 1145 can transmit fingerprints and/or content metadata generated therein to the central indexing engine 1129 for integration and storage in the central fingerprint repository 1139. Advantageously, in certain embodiments, the content-exposure analysis system 127 can thereby analyze and/or generate exposure information related to the user content 1157 in a similar fashion to that which is described relative to the central content 1111. Example operation of the user-environment indexing engine 1145 will be described with respect to FIG. 13.

In certain embodiments, the data request module 1147 can be a hardware and/or software module operable to request exposure information related to particular content from the content-exposure analysis system 127. The data request module 1147 can transmit the requests, for example, to the data access system 1137. Each request can include or identify fingerprints of one or more content items to which the request pertains. In general, the data request module 1147 can request any type of information maintained in the central fingerprint repository 1139, the exposures repository 1141, and/or the analytics repository 1143.

In certain embodiments, the presentation module 1149 can be a module operable to integrate with software of a user environment on the client 1114. For example, the presentation module 1149 can integrate with a graphical user interface (GUI) provided by an operating system, other software such as communications software (e.g., an email client), combinations of same, and/or the like. In certain embodiments, the presentation module 1149 can be accessible via menus or other display items of a GUI with which it is integrated. In some instances, the presentation module 1149 may also be referred to as a plug-in or extension of a given software application.

In various cases, the presentation module 1149 can receive and service user requests for exposure information for particular content. In an example, the presentation module 1149 can be integrated with a GUI (e.g., an operating system GUI) that provides a view of a file system maintained thereby. According to this example, the presentation module 1149 may be operable to monitor for user selections of particular content, for example, for purposes of obtaining exposure information related thereto. In various cases, the user selections or requests can be made, for example, via graphical selection, context menus, hover-over actions, etc. In another example, the presentation module 1149 can be integrated with a GUI of an email client. According to this example, the presentation module 1149 may request and provide information related to content items to be transmitted over email.

The presentation module 1149 can forward requests for exposure information to the data request module 1147 for handling as described above. The requested exposure information can be received and, in some cases, transformed by the presentation module 1149 for presentation to a requesting user. The presentation module 1149 can provide a GUI overlay, on top of the GUI or software application with which it is integrated, that displays received and/or transformed information. For example, a user (e.g., an administrator, super user, chief security officer, regular user, or other user) could request information related to a number or frequency of exposure events for a selected content item (e.g., a document authored by the user) over a period of time. According to this example, the presentation module 1149 could generate and display scatterplots, pie charts, tables, bar charts, geospatial representations, heat map, chord charts, interactive graphs, bubble charts, candlestick charts, stoplight charts, spring graphs, and/or other types of charts, graphs, or manners of displaying data.

In some embodiments, the presentation module 1149 can detect user-initiated precursors of exposure events. The presentation module 1149 can monitor one or more GUIs with which it is integrated for one or more user actions that are deemed to be user-initiated precursors. For example, in an embodiment, the presentation module 1149 could be integrated with a communications client (e.g., an email or other messaging client) and detect that the user has entered one or more recipients into an appropriate field (e.g., a TO field, a CC field, a BCC field, etc.). In another example, the presentation module 1149 could be integrated with a web browser or other software application and detect that the user has uploaded a particular content item for sharing on a content-management platform.

It should be appreciated that, in various embodiments, the presentation module 1149 can be integrated with multiple software applications and/or GUIs. In addition, in many cases, the client 1114 can include multiple presentation modules similar to the presentation module 1149. Example operation of the presentation module 1149 will be described in greater detail with respect to FIGS. 18-19.

Figure 12:
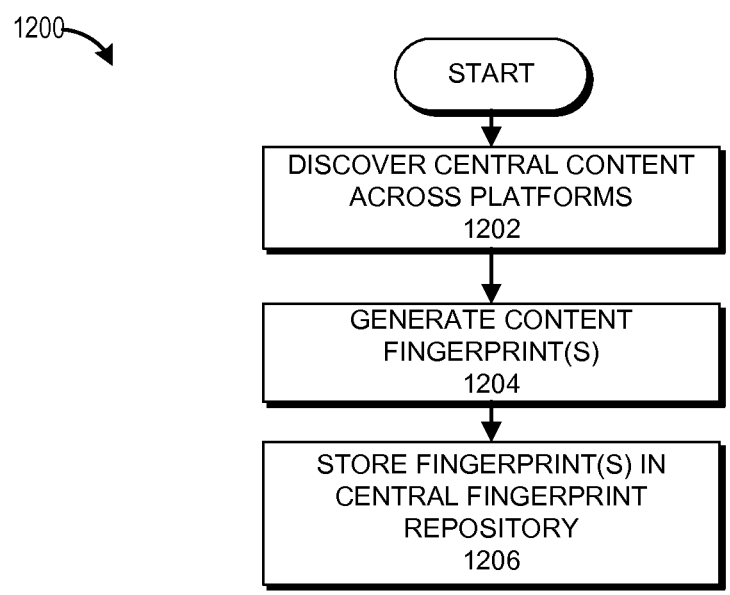
FIG. 12 illustrates an example of a process for indexing fingerprints of centrally-accessible content items.

FIG. 12 presents a flowchart of an example of a process 1200 for indexing fingerprints of centrally-accessible content items such as the central content 1111 of FIG. 11. In certain embodiments, the process 1200 can be triggered on-demand, at scheduled intervals, when new content or content sources are added to the system 1100, combinations of same and/or the like. The process 1200 can be implemented by any system that can process data. For example, the process 1200, in whole or in part, can be implemented by one or more of the central indexing engine 1129, the exposure projection module 1131, the exposure tracking module 1133, the content-reuse detection engine 1135, the data access system 1137, the event-density analysis module 1151, the user-environment indexing engine 1145, the data request module 1147, and/or the presentation module 1149. In some cases, the process 1200 can be performed generally by the content-exposure analysis system 127 and/or the client 1114. Although any number of systems, in whole or in part, can implement the process 1200, to simplify discussion, the process 1200 will be described in relation to the system 1100 of FIG. 11.

At block 1202, the central indexing engine 1129 discovers the central content 1111. In a typical embodiment, the central content 1111 is discovered across numerous heterogeneous platforms which, as described above, can be included among the central content sources 1176. For example, the central content sources 1176 can include business or internal email systems, non-business or external email systems, social networking accounts, inventory databases, file directories, enterprise systems, CRM systems, collaboration systems, etc.

In certain embodiments, the central indexing engine 1129 can discover the central content 1111 via the BIM system 130. In an example, the central indexing engine 1129 can discover the central content 1111 by identifying and accessing data collected by the data collection system 132 of the BIM system 130. In another example, the central indexing engine 1129 can discover the central content 1111 by identifying and accessing data that is available to the access manager 204 of the BIM system 130, etc. In certain embodiments, the central indexing engine 1129 can directly access the central content sources 1176 for purposes of discovering the central content 1111.

At block 1204, the central indexing engine 1129 generates one or more content fingerprints for each item of content in the central content 1111 or a subset thereof. In general, the content fingerprints can be generated as described with respect to FIG. 11. At block 1206, the central indexing engine 1129 stores the generated content fingerprints in the central fingerprint repository 1139. In many cases, content metadata can be stored with the generated content fingerprints. The content metadata can include, for example, a title, timing information, an author of the content item, an organization associated with the content item, etc. as described above in relation to FIG. 11.

Figure 13:
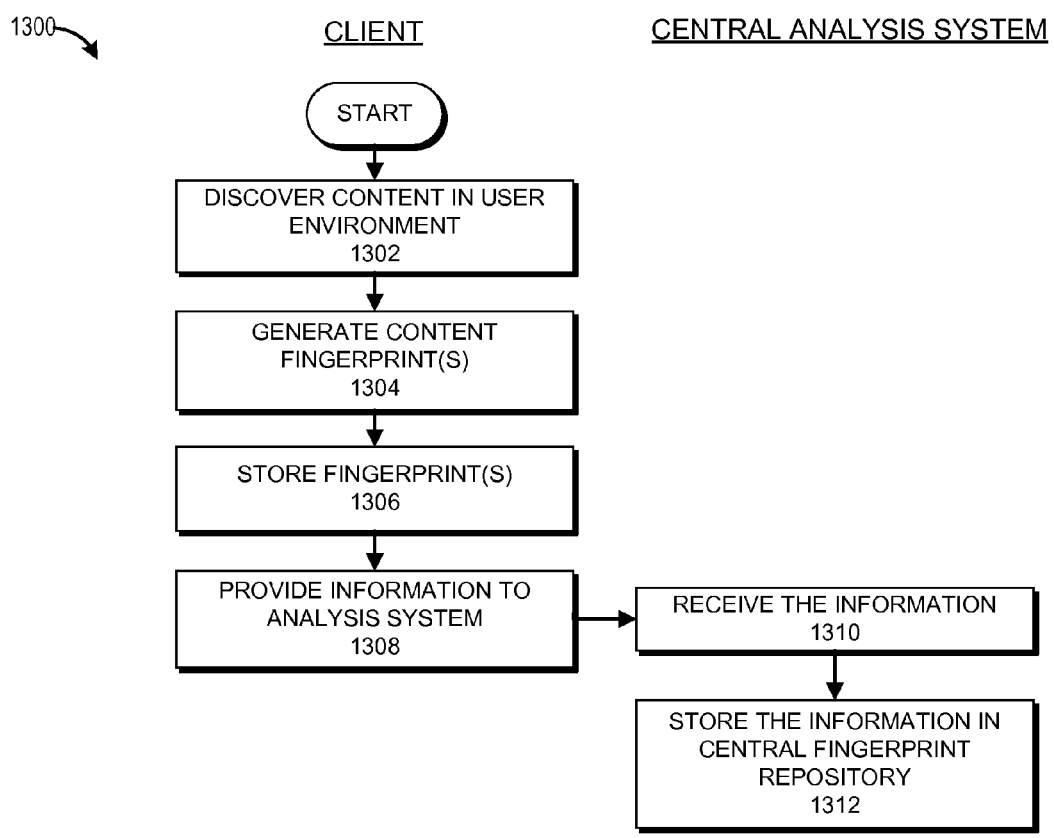
FIG. 13 illustrates an example of a process for indexing fingerprints of content in a user environment.

FIG. 13 presents a flowchart of an example of a process 1300 for indexing fingerprints of content in a user environment such as the user content 1157. In certain embodiments, the process 1300 can be triggered on-demand, at scheduled intervals, when new content and/or content sources are added to the user content sources 1155, combinations of same and/or the like. The process 1300 can be implemented by any system that can process data. For example, the process 1300, in whole or in part, can be implemented by one or more of the central indexing engine 1129, the exposure projection module 1131, the exposure tracking module 1133, the content-reuse detection engine 1135, the data access system 1137, the event-density analysis module 1151, the user-environment indexing engine 1145, the data request module 1147, and/or the presentation module 1149. In some cases, the process 1300 can be performed generally by the content-exposure analysis system 127 and/or the client 1114. Although any number of systems, in whole or in part, can implement the process 1300, to simplify discussion, the process 1300 will be described in relation to the system 1100 of FIG. 11.

At block 1302, the user-environment indexing engine 1145 discovers the user content 1157. For example, in some embodiments, local drives, network drives, and/or cloud drives accessible to the client 1114 can be identified and accessed. According to this example, the block 1302 can include discovering content items on the local drives, network drives, cloud drives, etc. At block 1304, the user-environment indexing engine 1145 generates or more content fingerprints (e.g., substring fingerprints) for each content item in the user content 1157 or a subset thereof. In general, the content fingerprints can be generated as described with respect to FIG. 11 in relation to the central indexing engine 1129.

At block 1306, the user-environment indexing engine 1145 stores the content fingerprints generated at the block 1304 in the user fingerprint repository 1153. In many cases, content metadata can be extracted from the content items and stored with the fingerprints in the user fingerprint repository 1153 as described above in relation to FIG. 11. At block 1308, the user-environment indexing engine 1145 provides information related to the generated content fingerprints to the central indexing engine 1129 of the content-exposure analysis system 127. The provided information can include, for example, the generated fingerprints, content metadata, and/or other data.

At block 1310, the central indexing engine 1129 receives the information. At block 1312, the central indexing engine 1129 stores the information in the central fingerprint repository 1139. In certain embodiments, the information can be stored in relation to the client 1114 and/or a user of the client 1114. In this fashion, in certain embodiments, clients such as the client 1114 can serve as additional content-fingerprint sources for the content-exposure analysis system 127.

Figure 14:
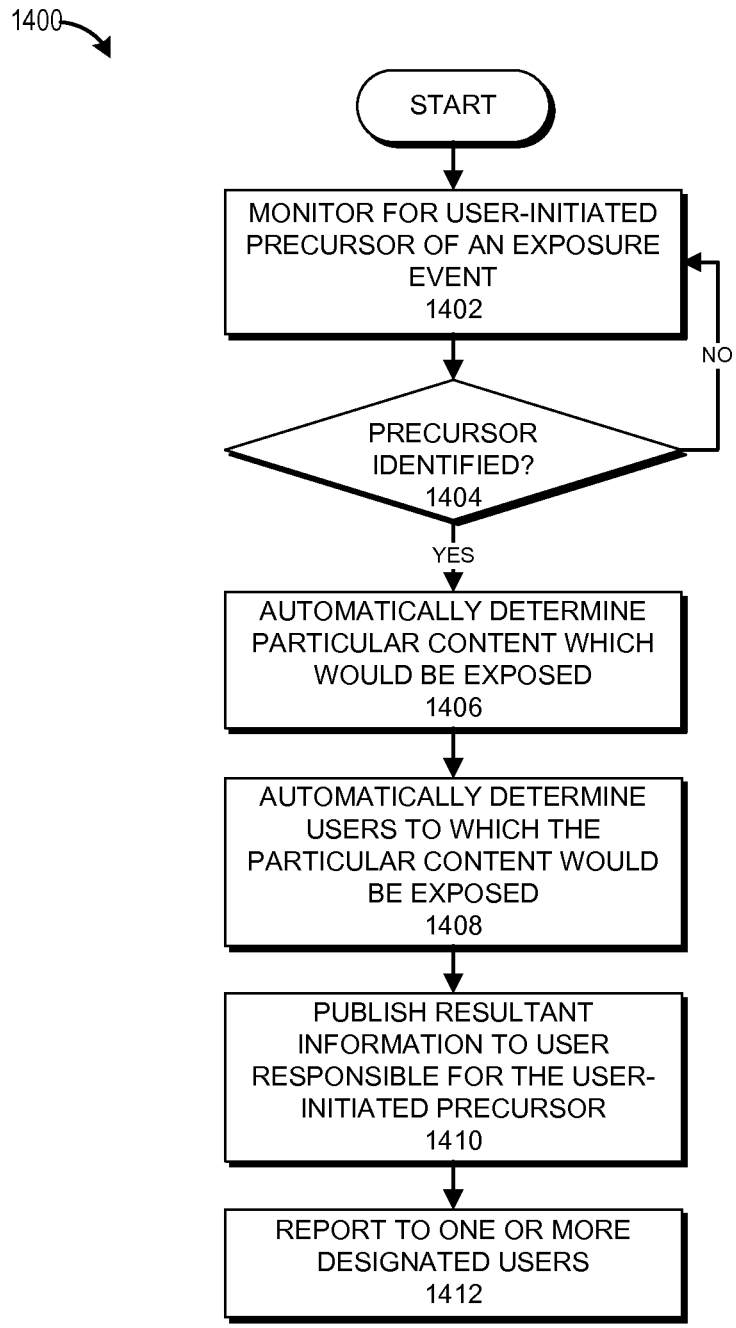
FIG. 14 illustrates an example of a process for projecting a potential exposure of a content-exposure event.

FIG. 14 presents a flowchart of an example of a process 1400 for projecting a potential exposure of a content-exposure event. The process 1400 can be implemented by any system that can process data. For example, the process 1400, in whole or in part, can be implemented by one or more of the central indexing engine 1129, the exposure projection module 1131, the exposure tracking module 1133, the content-reuse detection engine 1135, the data access system 1137, the event-density analysis module 1151, the user-environment indexing engine 1145, the data request module 1147, and/or the presentation module 1149. In some cases, the process 1400 can be performed generally by the content-exposure analysis system 127 and/or the client 1114. Although any number of systems, in whole or in part, can implement the process 1400, to simplify discussion, the process 1400 will be described in relation to the system 1100 of FIG. 11.

At block 1402, the exposure projection module 1131 monitors for a user-initiated precursor of an exposure event. In various embodiments, a user-initiated precursor of an exposure event can be an anticipated exposure event in relation to any content indexed in the central fingerprint repository 1139 and/or the user fingerprint repository 1153. In some cases, the block 1402 can include the exposure projection module 1131 monitoring for notifications from the presentation module 1149 that a user-initiated precursor has been detected by the presentation module 1149 (e.g., via entry of addresses or recipients in a TO, CC, or BCC field). In these cases, the notification can include, for example, information related to the user-initiated precursor such as data related to what content the user was attempting to expose, how the user was attempting to expose the content, and to whom the user was attempting to expose the content. For instance, the notification could include all or part of a communication such as an email. In other cases, the exposure projection module 1131 can monitor the central content sources 1176 (e.g., various ones of the internal data sources 120 or the external data sources 122 of FIG. 1) for transmissions, selections, or uploads of content.

In a particular example of the exposure projection module 1131 detecting the user-initiated precursor, the exposure projection module 1131 could monitor and detect draft communications that appear on a given communications platform (e.g., one of the internal data sources 120 or external data sources 122 of FIG. 1). Draft communications can, in some cases, appear in a drafts folder of a user. According to this example, the appearance of a draft communication in a drafts folder of the user can itself be a user-initiated precursor of an exposure event and/or a way to evaluate for the existence of a user-initiated precursor of an exposure event. In another example, the exposure projection module 1131 could be integrated in a web or cloud-based communications client that directly detects, for example, when the user enters recipients into a TO field, CC field, BCC field, etc.

At decision block 1404, the exposure projection module 1131 determines whether a user-initiated precursor of an exposure event has been identified. If not, the process 1400 returns to block 1402 and proceeds as described above. Otherwise, if it is determined at decision block 1404 that a user-initiated precursor of an exposure event has been identified, the process 1400 proceeds to block 1406.

At block 1406, the exposure projection module 1131 automatically determines particular content that would be exposed if the exposure event were to occur. The particular content can be, for example, a file that is uploaded (or selected to be uploaded) to a collaboration platform, a file that is attached to communication such as an email or other message, inline text of an email or other message, combinations of same and/or the like.

At block 1408, the exposure projection module 1131 automatically determines users to which the particular content would be exposed if the anticipated exposure event were to occur. In a typical embodiment, the exposure projection module 1131 can identify user indications of who will be given access to the particular content and then aggregate those users covered by the user indications. For example, if the anticipated exposure event is a communication containing or attaching the particular content, the exposure projection module 1131 can identify users or groups of users who are addressees of the communication or who are members of an indicated distribution list and aggregate those user groups or distribution list. By way of further example, if the anticipated exposure event is uploading, or publishing, the particular content to a site or page on a collaboration platform, the exposure projection module 1131 can identify and aggregate users or groups of users who are given access to the site or page as indicated, for example, by an access control list.

In some embodiments, the block 1408 can include quantitatively evaluating an anticipated breadth of the anticipated exposure event based, at least in part, on an aggregation of users as described above. For instance, the exposure projection module 1131 can generate an assessment of the anticipated exposure event such as, for example, a total number of users to whom the particular content would be exposed if the exposure event were to occur. In an example, the exposure project module 1131 could classify the anticipated exposure event into one or more categories such as, for example, mild, moderate, great, extreme, etc. The classification could be based on, for example, a number of users to whom the particular content would be exposed (e.g., "mild" if the number is less than three, "moderate" if the number is greater than or equal to three but less than ten, "great" if the number is greater than or equal to ten, "extreme" if the particular content is going to be made accessible to the public, etc.).

At block 1410, the exposure projection module 1131 publishes resultant information to a user. The resultant information can be, for example, any information received or generated at the block 1408. The user can be, for example, a user of the client 1114 of FIG. 11. In some embodiments, the publication at the block 1410 can include making the resultant information available for transmission to the client 1114. In addition, or alternatively, the publication at the block 1410 can include providing the resultant information to the presentation module 1149 for immediate presentation to the user. In these cases, the resultant information can be provided, for example, as a UI overlay on the GUI with which the presentation module 1149 is integrated.

At block 1412, a report containing information related to the resultant information can be sent to one or more designated users such as, for example, a manager of the user, a user associated with the particular content in the central fingerprint repository 1139 (e.g., a user associated with a first use of an identical or sufficiently similar content fingerprint), combinations of same, and/or the like. In some embodiments, the block 1412 can be omitted such that user-initiated precursors of content-exposure events are not reported. From block 1412, the process 1400 returns to block 1402 and proceeds as described above. In general, the process 1400 can continue until terminated by an administrator or other user or other stop criteria is satisfied.

Figure 15:
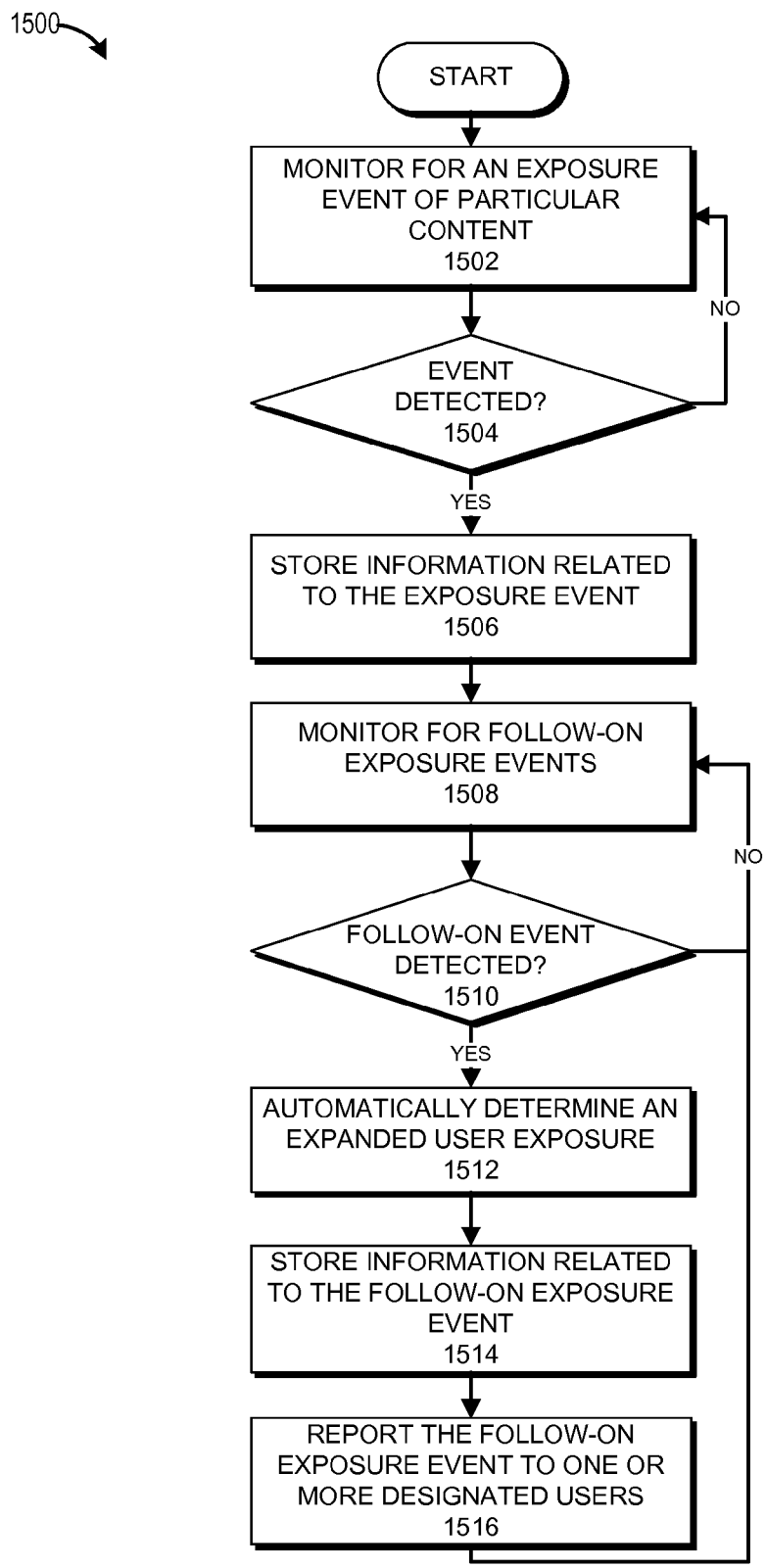
FIG. 15 illustrates an example of a process for detecting and handling exposure events.

FIG. 15 presents a flowchart of an example of a process 1500 for detecting and handling exposure events. The process 1500 can be implemented by any system that can process data. For example, the process 1500, in whole or in part, can be implemented by one or more of the central indexing engine 1129, the exposure projection module 1131, the exposure tracking module 1133, the content-reuse detection engine 1135, the data access system 1137, the event-density analysis module 1151, the user-environment indexing engine 1145, the data request module 1147, and/or the presentation module 1149. In some cases, the process 1500 can be performed generally by the content-exposure analysis system 127 and/or the client 1114. Although any number of systems, in whole or in part, can implement the process 1500, to simplify discussion, the process 1500 will be described in relation to the system 1100 of FIG. 11.

At block 1502, the exposure tracking module 1133 monitors for an exposure event of particular content. For example, the exposure tracking module 1133 can monitor communications platforms (e.g., various ones of the internal data sources 120 or the external data sources 122 of FIG. 1) for transmissions of the particular content. At decision block 1504, the exposure tracking module 1133 determines whether an exposure event has been detected. If not, the process 1500 returns to block 1502 and proceeds as described above. Otherwise, if it is determined at decision block 1504 that an exposure event has been detected, the process 1500 proceeds to block 1506.

At block 1506, the exposure tracking module 1133 stores information related to the exposure event in the exposures repository 1141. The stored information can include, for example, an identifier for the exposure event, a date and time at which the exposure event occurred, an identifier for the particular content that was exposed, a scope of exposure, combinations of same and/or the like. The scope of exposure can be, for example, users to whom the particular content was exposed. In some cases, the scope of exposure can be automatically determined in the fashion described with respect to block 1408 of FIG. 14, with the primary difference being that the exposure event is actual rather than merely anticipated. In addition, the scope of exposure can be represented using any of the metrics or values described with respect to the block 1408 of FIG. 14.

At block 1508, the exposure tracking module 1133 monitors for follow-on exposure events which chain from the exposure event. For example, a follow-on exposure event could occur when a user to whom the particular content is exposed as a result of exposure event further exposes the content to one or more other users (e.g., using a communications platform). There can be multiple successive levels of follow-on exposure events. In some embodiments, the exposure tracking module 1133 can use a tree abstract data type, in which the original exposure event is a root, to track exposure events related to the particular content.

At decision block 1510, the exposure tracking module 1133 determines whether a follow-on event has been detected. If not, the process 1500 returns to block 1508 and proceeds as described above. Otherwise, if it is determined at the decision block 1510 that a follow-on event has been detected, the process 1500 proceeds to block 1512.

At block 1512, the exposure tracking module 1133 determines an expanded user exposure resulting from the follow-on exposure event. The expanded user exposure can be, for example, additional users to whom the particular content was exposed as a result of the follow-on exposure event. In some cases, the expanded user exposure can be automatically determined in the fashion described with respect to block 1408 of FIG. 14, with the primary difference being that the follow-on exposure event is an actual exposure rather than merely an anticipated exposure. In addition, the expanded user exposure can be represented using any of the metrics or values described with respect to the block 1408 of FIG. 14.

At block 1514, the exposure tracking module 1133 stores information related to the follow-on exposure event in the exposures repository 1141. The stored information can include, for example, an identifier for the follow-on exposure event, a date and time at which the follow-on exposure event occurred, an identifier for the particular content that was exposed, the expanded user exposure (or related values or metrics), a relationship to a parent exposure event (e.g., an identifier for an exposure event from which the follow-exposure event chains), combinations of same and/or the like.

At block 1516, a report containing information related to the follow-on exposure event can be sent to one or more designated users such as, for example, a manager of the user, a user associated with the particular content in the central fingerprint repository 1139 (e.g., a user associated with an original exposure event, a user associated with a first use of an identical or sufficiently similar content fingerprint), combinations of same, and/or the like. In some embodiments, the block 1516 can be omitted such that follow-on exposure events are not reported. From block 1516, the process 1500 returns to block 1508 and proceeds as described above. In general, the process 1500 can continue until terminated by an administrator or other user or other stop criteria is satisfied.

For ease of illustration and description, the process 1500 is described above relative to a single original exposure event. However, in certain embodiments, the process 1500 can occur with respect to a plurality of content items (e.g., in the central content 1111 and/or the user content 1157) and, consequently, with respect to a plurality of exposure events. In some embodiments, the process 1500 can be executed periodically as a scheduled task with respect to a plurality of content items (e.g. in the central content 1111 and/or the user content 1157) so as to identify exposure events and follow-on exposure events. In addition, or alternatively, the process 1500 can monitor for exposure events and follow-on exposure events continuously.

Figure 16:
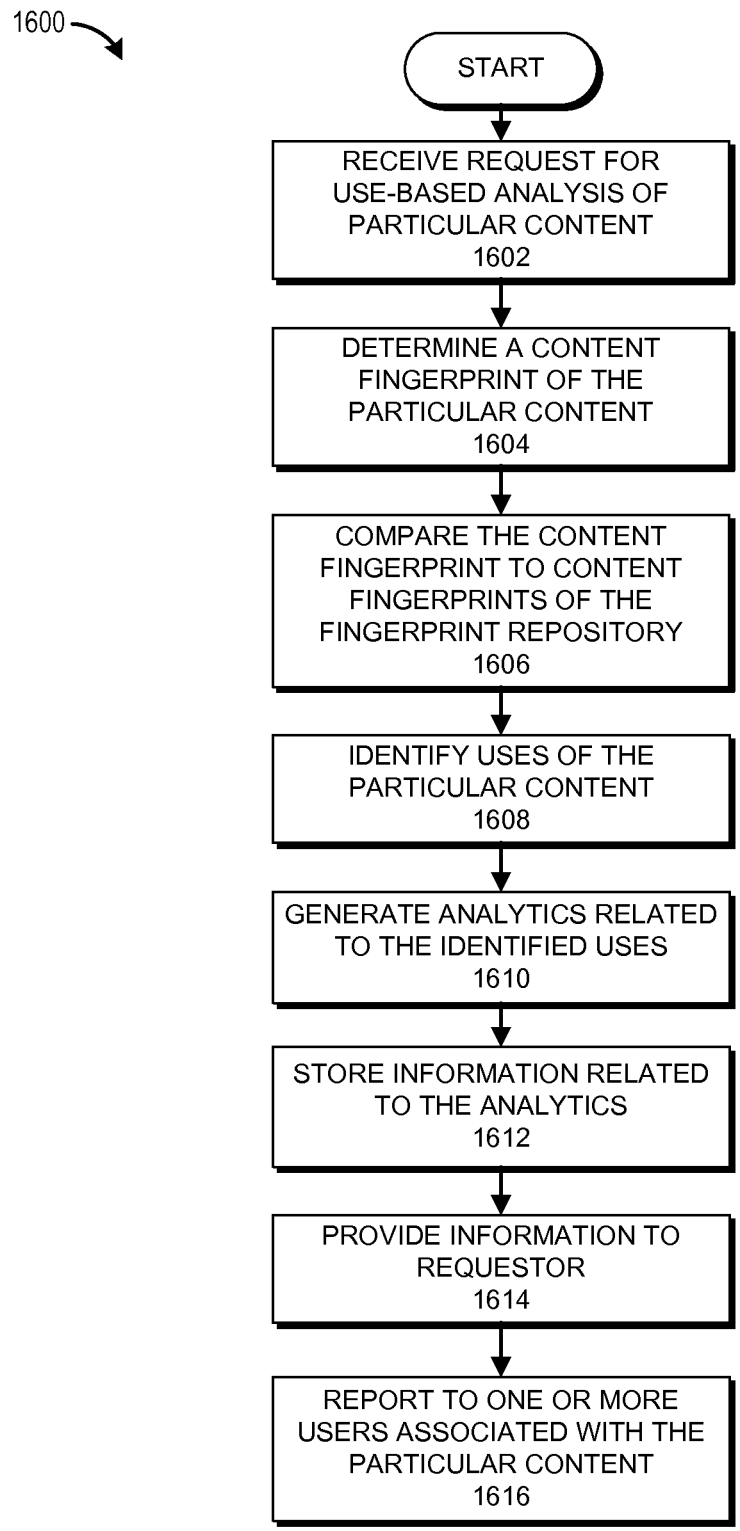
FIG. 16 illustrates an example of a process for a use-based analysis of particular content.

FIG. 16 presents a flowchart of an example of a process 1600 for a use-based analysis of particular content. The process 1600 can be implemented by any system that can process data. For example, the process 1600, in whole or in part, can be implemented by one or more of the central indexing engine 1129, the exposure projection module 1131, the exposure tracking module 1133, the content-reuse detection engine 1135, the data access system 1137, the event-density analysis module 1151, the user-environment indexing engine 1145, the data request module 1147, and/or the presentation module 1149. In some cases, the process 1600 can be performed generally by the content-exposure analysis system 127 and/or the client 1114. Although any number of systems, in whole or in part, can implement the process 1600, to simplify discussion, the process 1600 will be described in relation to the system 1100 of FIG. 11.

At block 1602, the content-reuse detection engine 1135 receives a request to perform a use-based analysis of particular content. In certain embodiments, the request can result from a scheduled task, an on-demand trigger by an administrator, chief security officer, super user or other user, a request received via the data access system 1137, combinations of same, and/or the like. In a typical embodiment, the request identifies the particular content, for example, by one or more content fingerprints or other identifier(s).

At block 1604, the content-reuse detection engine 1135 determines a content fingerprint for the particular content. In cases where the content fingerprint is included or specified in the request, the content-reuse detection engine 1135 can determine the content fingerprint directly from the request. In some cases, the content fingerprint can be determined by searching the central fingerprint repository 1139 for an identifier included with the request and retrieving a corresponding content fingerprint. In still other cases, the content-reuse detection engine 1135 can generate the content fingerprint as described, for example, with respect to FIG. 11.

At block 1606, the content-reuse detection engine 1135 compares the content fingerprint of the particular content to content fingerprints of the central fingerprint repository 1139. At block 1608, the content-reuse detection engine 1135 identifies uses of the particular content based on the comparison at block 1604. In a typical embodiment, each content fingerprint of the central fingerprint repository 1139 which sufficiently matches the content fingerprint of the particular content can be considered a use of the particular content. For example, as described with respect to FIG. 11, a content fingerprint of a given content item can include a set of sub string fingerprints.

In certain embodiments, for purposes of identifying the uses of the particular content, the content-reuse detection engine 1135 can compute one or more similarity values for each content item represented in the central fingerprint repository 1139 or a subset thereof. In an example, the content-reuse detection engine 1135 could determine, for each content item represented in the central fingerprint repository 1139, a number or percentage of substring fingerprints of the particular content which match a substring fingerprint of the content item. According to this example, a given content item of the central fingerprint repository 1139 could be considered to sufficiently match the particular content if its similarity value exceeds a configurable similarity threshold (e.g., ninety-five percent). In some embodiments, a combination of similarity thresholds can be utilized.

At block 1610, the content-reuse detection engine 1135 generates analytics related to the uses identified at block 1608. For example, the content-reuse detection engine 1135 could identify an earliest use of the uses based on timing information. According to this example, the content-reuse detection engine 1135 could further determine a user associated with the earliest use. The user associated with the earliest use may be considered an originator of the particular content. In another example, each use subsequent to a date and time associated with the particular content can be identified as a re-use. According to this example, the content-reuse detection engine 1135 can further determine a user associated with each identified re-use.

In another example, the content-reuse detection engine 1135 could determine an influence of the particular content. In an example, the influence could be determined by how many users have a copy of the particular content, for example, as a result of receiving identical fingerprints from multiple clients similar to the client 1114 in the fashion described with respect to FIG. 13. The influence could also be a score that weights a plurality of numeric factors such as a number of users who have a copy of the particular content, a number of users who are responsible for exposure events of the particular content (e.g., as determined from the exposures repository 1141), a number of users represented in the uses identified at block 1608, a number of exposure events which are exposures outside the organization (e.g., as determined domains, access control list, platform to which content is being exposed, etc.), combinations of same and/or the like.

In still another example, the content-reuse detection engine 1135 could identify subsequent reuses of the particular content in which content metadata has been altered. For instance, the content-reuse detection engine 1135 could identify any instances in which content metadata has been altered to modify an author field. As another example, the content-reuse detection engine 1135 could analyze a virality of the particular content. In certain embodiments, virality can be a measure of the tendency of the particular content to be circulated rapidly and widely. For example, the content-reuse detection engine 1135 could determine whether the content is stale (e.g., limited distribution as indicated by a number of exposure events below a threshold value, no exposure events within a certain time period such as one month, etc.), "hot" (e.g., acceleration of exposure events, an influence score over a threshold, etc.), "declining" (e.g., deceleration of exposure events relative to a previous time period), combinations of same and/or the like.

At block 1612, the content-reuse detection engine 1135 can store the analytics generated at block 1610 and/or information related to the analytics in the analytics repository 1143. At block 1614, information related to the analytics can be provided, for example, to a requestor (e.g., the presentation module 1149). At block 1616, a report containing information related to the generated analytics can be sent to one or more designated users such as, for example, a user associated with an earliest use of the particular content, a user associated with the particular content in content metadata (e.g., a user who created or last edited the particular content), combinations of same and/or the like. In some embodiments, the block 1616 can be omitted such that no reports are generated and sent.

Figure 17:
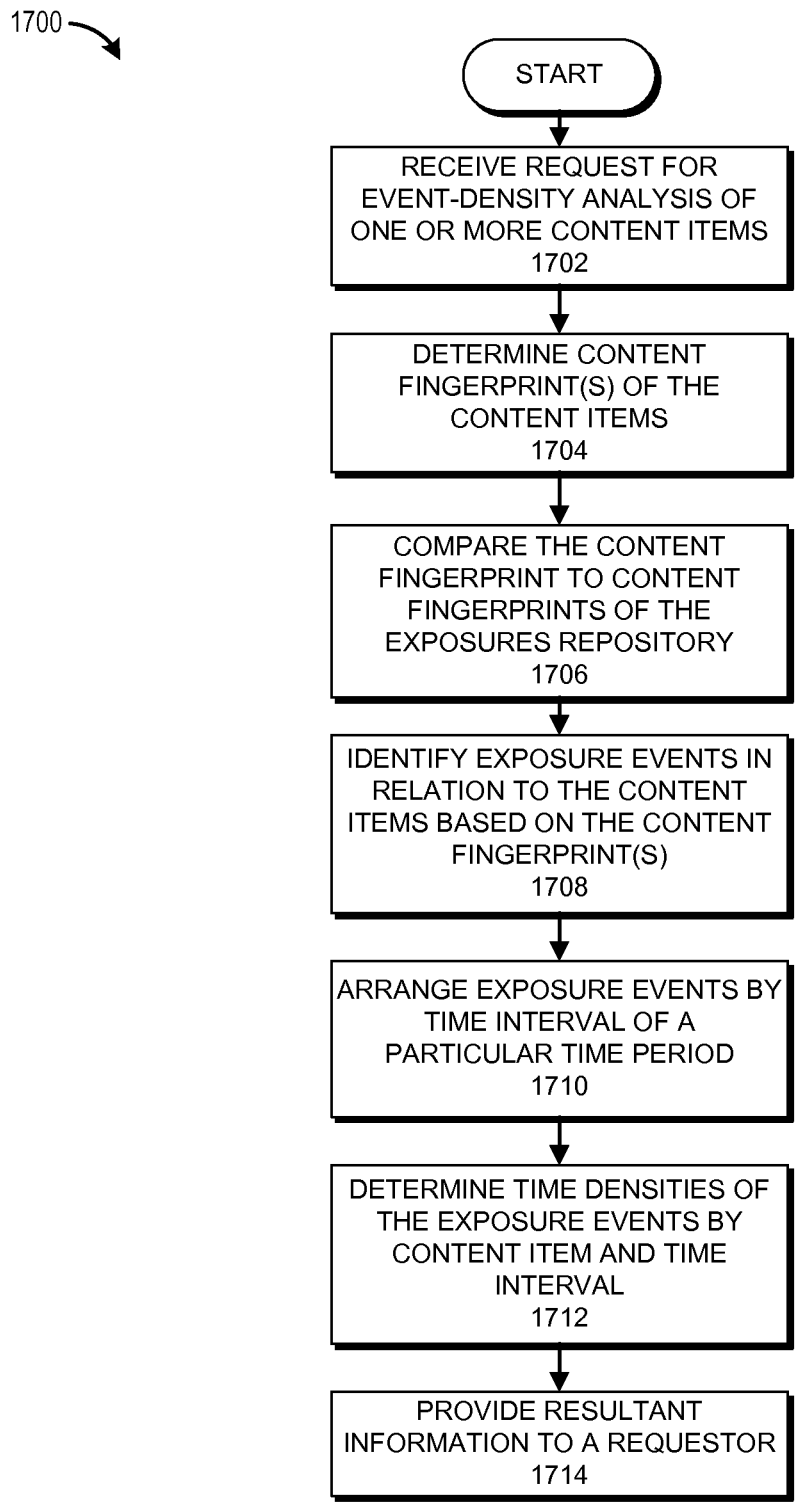
FIG. 17 illustrates an example of a process for performing an event-density analysis particular content.

FIG. 17 presents a flowchart of an example of a process 1700 for performing an event-density analysis of particular content. The process 1700 can be implemented by any system that can process data. For example, the process 1700, in whole or in part, can be implemented by one or more of the central indexing engine 1129, the exposure projection module 1131, the exposure tracking module 1133, the content-reuse detection engine 1135, the data access system 1137, the event-density analysis module 1151, the user-environment indexing engine 1145, the data request module 1147, and/or the presentation module 1149. In some cases, the process 1700 can be performed generally by the content-exposure analysis system 127 and/or the client 1114. Although any number of systems, in whole or in part, can implement the process 1700, to simplify discussion, the process 1700 will be described in relation to the system 1100 of FIG. 11.

At block 1702, the event-density analysis module 1151 receives a request for event-density analysis of one or more content items. In certain embodiments, the request can result from a scheduled task, an on-demand trigger by an administrator, chief security officer, super user or other user, a request received via the data access system 1137, combinations of same, and/or the like. In a typical embodiment, the request identifies the content items, for example, by one or more content fingerprints or other identifier(s). For example, the request can indicate a desire for any of the information operable to be generated or stored by the central indexing engine 1129, the exposure projection module 1131, the exposure tracking module 1133, the content-reuse detection engine 1135, and the event-density analysis module 1151. The request can also specify filter criteria, which will be described in greater detail below with respect to FIG. 18.

At block 1704, the event-density analysis module 1151 determines a content fingerprint for the content items. In cases where the content fingerprint is included or specified in the request, the event-density analysis module 1151 can determine the content fingerprint directly from the request. In some cases, the content fingerprint can be determined by searching the central fingerprint repository 1139 for an identifier included with the request and retrieving a corresponding content fingerprint. In still other cases, the event-density analysis module 1151 can generate the content fingerprint as described, for example, with respect to FIG. 11.

At block 1706, the event-density analysis module 1151 compares the content fingerprints of the content items to content fingerprints of content items represented in the exposures repository 1141. At block 1708, the event-density analysis module 1151 identifies exposure events related to the content items based on the comparison at block 1706. In a typical embodiment, the event-density analysis module 1151 can identify exposure events which involve content sufficiently similar to at least one of the content items. In some embodiments, the event-density analysis module 1151 can use similarity values as described with respect to block 1608 of FIG. 16.

At block 1710, the event-density analysis module 1151 arranges the identified exposure events by time interval of a particular time period. In some embodiments, the particular time period and/or time intervals thereof can be specified in the request received at block 1702 such that only exposure events corresponding to that time period were identified at block 1708. For example, the event-density analysis module 1151 could arrange the events by days of a 30-day time period pursuant to the request. According to this example, each of the identified exposure events could be associated with a particular day of the time period. In other embodiments, the time period can be a time period over which the identified exposure events occur (e.g., with no time limitation). In these embodiments, the time intervals of the time period could be a certain number of equal divisions thereof such as, for example, ten.

At block 1712, the event-density analysis module 1151 determines time densities of the identified exposure events by content item and time interval. For example, for each of the content items identified in the request received at block 1702, the event-density analysis module 1151 could determine a number of exposure events for each time interval of the time period. The number of exposure events can be considered an example of a time density. At block 1714, the event-density analysis module 1151 provides resultant information to a requestor (e.g., the presentation module 1149). In some cases, the resultant information can be stored in the analytics repository 1143 or other memory.

Figure 18:
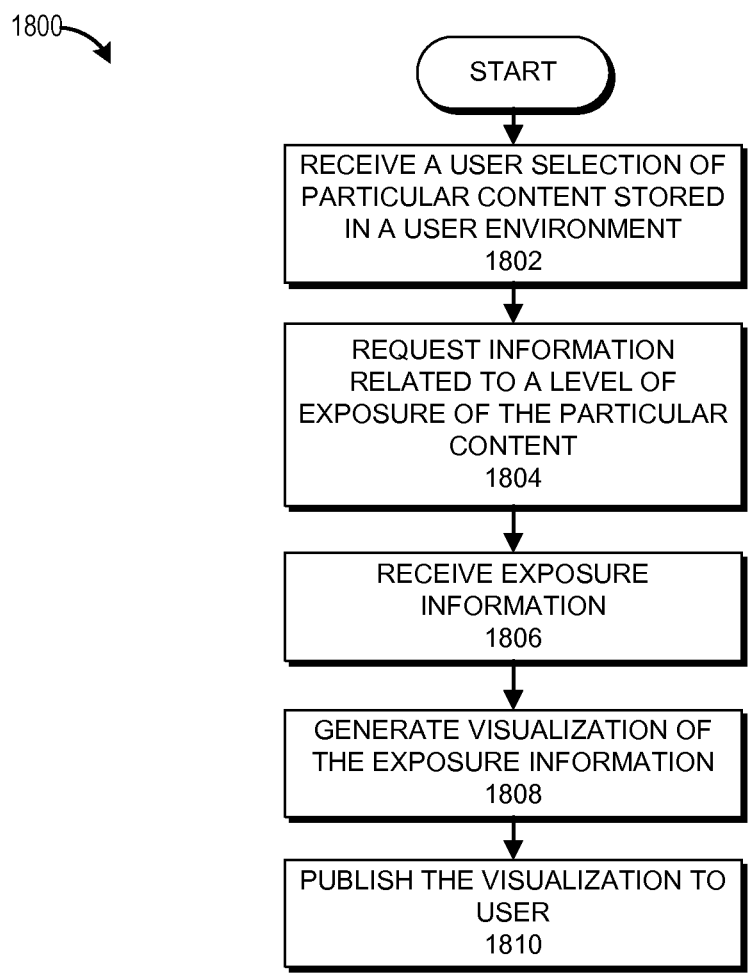
FIG. 18 illustrates an example of a process for providing user analytics related to exposure events.

FIG. 18 presents a flowchart of an example of a process 1800 for providing user analytics related to exposure events. The process 1800 can be implemented by any system that can process data. For example, the process 1800, in whole or in part, can be implemented by one or more of the central indexing engine 1129, the exposure projection module 1131, the exposure tracking module 1133, the content-reuse detection engine 1135, the data access system 1137, the event-density analysis module 1151, the user-environment indexing engine 1145, the data request module 1147, and/or the presentation module 1149. In some cases, the process 1800 can be performed generally by the content-exposure analysis system 127 and/or the client 1114. Although any number of systems, in whole or in part, can implement the process 1800, to simplify discussion, the process 1800 will be described in relation to the system 1100 of FIG. 11.

At block 1802, the presentation module 1149 of the client 1114 receives a user selection of particular content stored in a user environment. For example, a user of the client 1114 can graphically select one or more content items such as a plurality of files of a file system, all files of the user environment, etc. The user can be, for example, an administrator, chief security officer, super user or other user The user selection, or request, can also specify filter criteria, which will be described in greater detail below. At block 1804, the data request module 1147 requests, via the data access system 1137, information related to a level of exposure of the particular content.

In various cases, the request, at the user's direction, can filter exposure events by one or more criteria. For example, in one embodiment, the request could include filter conditions that specify information generated and stored as described in U.S. patent application Ser. No. 14/297,944 ("the '944 application"), which application is hereby incorporated by reference. For example, the request could group exposure events by number of users, by device (e.g., mobile device or non-mobile device as described in the '944 application), by department (e.g., as determined from a directory service), by IP address (e.g., by specific IP address or whether the IP address is internal or external to an organization as described in the '944 application), etc.

By way of further example, the request could specify top forwarders or duplicators of the particular content (e.g., a top-N users by total number of exposure events in connection with the content items), most influential forwarders or duplicators (e.g., top ten highest users in an organizational hierarchy who are responsible for an exposure event involving one of the content items), most-recent exposure events (e.g., last thirty days), exposure events that are only partial use (e.g., as a result of having a similarity value of less than one-hundred percent), etc.

By way of additional example, the request could filter the exposure events to only include exposure events involving content with altered metadata (e.g., author, date, file size, number of words etc.), only exposure events in which content was exposed to external domains, only exposure events involving a particular document type (e.g., document with a particular file extension, inline text from email or instant messaging, etc.), only exposure events involving a particular platform (e.g., only a particular collaboration platform), etc.

At block 1806, the data request module 1147 receives exposure information responsive to the request. In various embodiments, the exposure information can be generated by the exposure projection module 1131, the exposure tracking module 1133, the content-reuse detection engine 1135 and/or the event-density analysis module as described with respect to FIGS. 14-17.

At block 1808, the presentation module 1149 generates a visualization of the exposure information. The visualization could be, for example, a scatterplot, pie chart, table, bar chart, geospatial representation, heat map, chord chart, interactive graph, bubble chart, candlestick chart, stoplight chart, spring graph, and/or another type of chart, graph, or manner of displaying data. An example will be described in relation to FIG. 19. At block 1810, the presentation module 1149 publishes the visualization to the user, for example, by causing the visualization to be displayed to the user.

Figure 19:
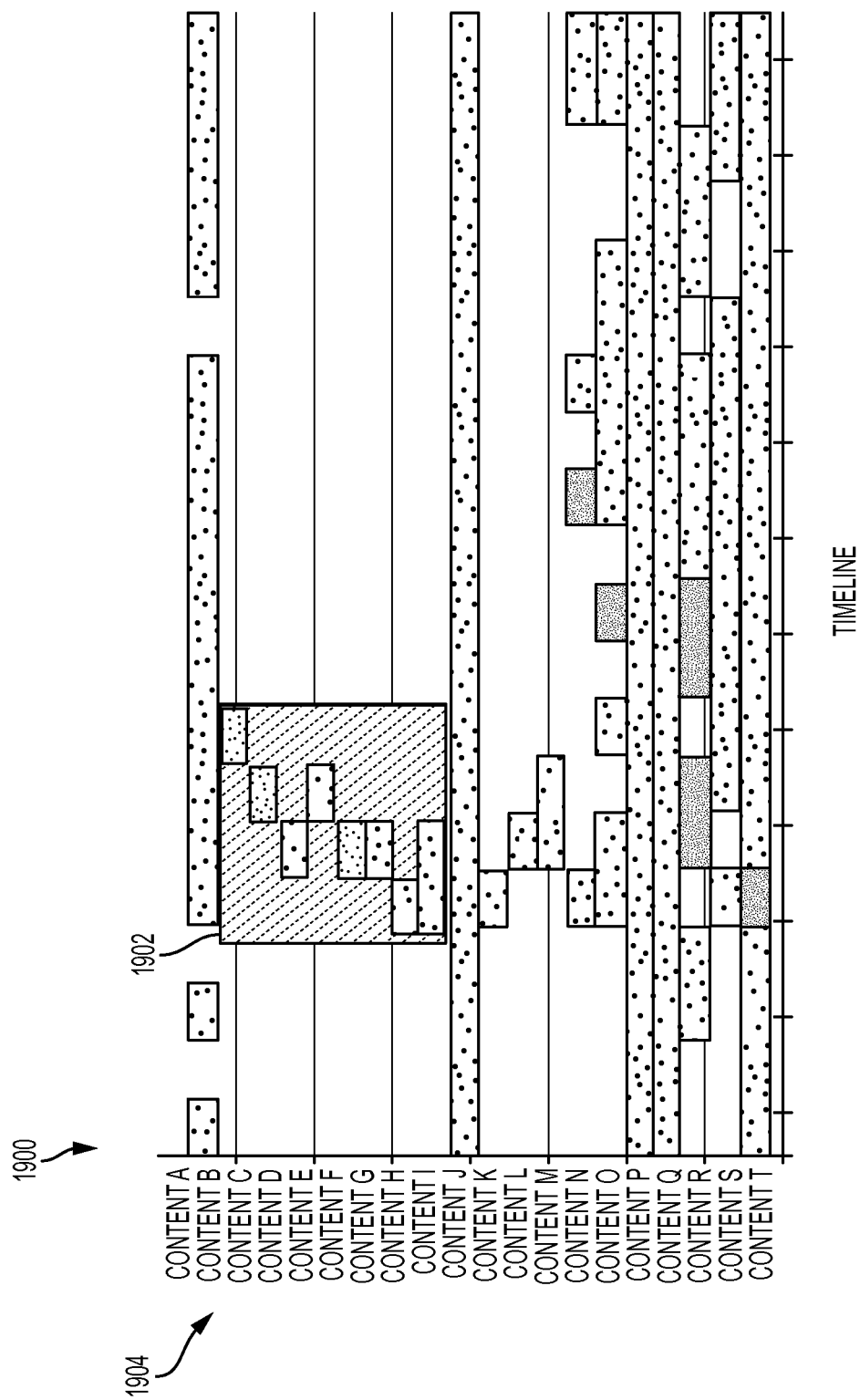
FIG. 19 illustrates an example of an interactive heat map.

FIG. 19 illustrates an example of an interactive heat map 1900. In certain embodiments, the interactive heat map 1900 can be a visualization generated by the presentation module 1149 as described with respect to block 1808 of FIG. 18. More particularly, the presentation module 1149 can generate the interactive heat map 1900 based on an output of the event-density analysis module 1151. In the illustrated embodiment, the interactive heat map 1900 indicates time densities of exposure events for content items 1904. As shown, the time densities are arranged over a timeline, or time period.

In certain embodiments, the interactive heat map 1900 can permit the user to graphically select a portion thereof for purposes of obtaining additional information related thereto. For example, as shown, a graphical selection 1902 of a portion of the interactive heat map can permit the user to view more detailed information related to the selected exposure events. For example, the presentation module 1149 can provide information regarding specific exposure events such as, for example, an interactive report that identifies each exposure event and its corresponding time and content item. In addition, in certain embodiments, the interactive heat map 1900 can permit the user to filter by number of people, device (e.g., specific device, mobile device, or non-mobile device as described in the '944 application), department, IP address (e.g., internal versus external), etc.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising, by a computer system:
   identifying a user-initiated precursor of an anticipated exposure event;
   in response to the identifying, automatically determining particular content that would be exposed if the anticipated exposure event were to occur;
   automatically determining one or more users to which the particular content would be exposed if the anticipated exposure event were to occur;
   before the anticipated exposure event occurs, publishing a result of the automatically determining one or more users to a user associated with the user-initiated precursor; and
   in response to a detected occurrence of the anticipated exposure event, monitoring a plurality of communications platforms for follow-on exposure events in relation to the particular content which chain from the detected occurrence of the anticipated exposure event.

2. The method of claim 1, comprising:
   in response to a detected follow-on exposure event in relation to the particular content, automatically determining an expanded user exposure resulting from the follow-on exposure event; and
   reporting information related to the expanded user exposure to the user.

3. The method of claim 2, wherein the follow-on exposure event is initiated by a user of the one or more users.

4. The method of claim 1, wherein the automatically determining one or more users comprises:
   identifying one or more user indications of recipients of the particular content;
   aggregating users covered by the one or more user indications;
   quantitatively evaluating an anticipated breadth of the anticipated exposure event based, at least in part, on the aggregating; and
   wherein the publishing comprises providing a result of the quantitatively evaluating to the user.

5. The method of claim 4, wherein the one or more user indications comprise at least one of the following: a carbon-copy indication, a blind-carbon-copy indication, a distribution-list indication, and a user-group indication.

6. The method of claim 1, comprising:
   in response to the detected occurrence of the anticipated exposure event, generating one or more content fingerprints in relation to the particular content; and
   storing the one or more content fingerprints in a repository of content fingerprints in relation to the user.

7. The method of claim 6, comprising:
   comparing a particular content fingerprint to the content fingerprints of the repository; and
   identifying at least one content fingerprint of the repository as a subsequent reuse of the particular content fingerprint based, at least in part, on a result of the comparing.

8. The method of claim 6, comprising:
   comparing a particular content fingerprint to the content fingerprints of the repository;
   identifying a content fingerprint of the repository as an earliest use of the particular content fingerprint based, at least in part, on a result of the comparing; and
   identifying a user associated with the earliest use.

9. The method of claim 6, comprising:
   comparing at least one content fingerprint of the one or more content fingerprints to the content fingerprints of the repository;
   identifying a subsequent reuse of the at least one content fingerprint in which content metadata has been altered to modify an author field; and
   reporting the subsequent reuse to the user.

10. The method of claim 1, wherein the identifying comprises detecting the user-initiated precursor.

11. The method of claim 1, wherein the identifying comprises notification of the user-initiated precursor from a client information handling system.

12. An information handling system comprising:
    a processor, wherein the processor is operable to implement a method comprising:
      identifying a user-initiated precursor of an anticipated exposure event;
      in response to the identifying, automatically determining particular content that would be exposed if the anticipated exposure event were to occur;
      automatically determining one or more users to which the particular content would be exposed if the anticipated exposure event were to occur;
      before the anticipated exposure event occurs, publishing a result of the automatically determining one or more users to a user associated with the user-initiated precursor; and
      in response to a detected occurrence of the anticipated exposure event, monitoring a plurality of communications platforms for follow-on exposure events in relation to the particular content which chain from the detected occurrence of the anticipated exposure event.

13. The information handling system of claim 12, the method comprising:
    in response to a detected follow-on exposure event in relation to the particular content, automatically determining an expanded user exposure resulting from the follow-on exposure event; and
    reporting information related to the expanded user exposure to the user.

14. The information handling system of claim 13, wherein the follow-on exposure event is initiated by a user of the one or more users.

15. The information handling system of claim 12, wherein the automatically determining one or more users comprises:
    identifying one or more user indications of recipients of the particular content;
    aggregating users covered by the one or more user indications;
    quantitatively evaluating an anticipated breadth of the anticipated exposure event based, at least in part, on the aggregating; and
    wherein the publishing comprises providing a result of the quantitatively evaluating to the user.

16. The information handling system of claim 15, wherein the one or more user indications comprise at least one of the following: a carbon-copy indication, a blind-carbon-copy indication, a distribution-list indication, and a user-group indication.

17. The information handling system of claim 12, the method comprising:
    in response to the detected occurrence of the anticipated exposure event, generating one or more content fingerprints in relation to the particular content; and
    storing the one or more content fingerprints in a repository of content fingerprints in relation to the user.

18. The information handling system of claim 17, the method comprising:
    comparing a particular content fingerprint to the content fingerprints of the repository; and
    identifying at least one content fingerprint of the repository as a subsequent reuse of the particular content fingerprint based, at least in part, on a result of the comparing.

19. The information handling system of claim 17, the method comprising:
    comparing a particular content fingerprint to the content fingerprints of the repository;
    identifying a content fingerprint of the repository as an earliest use of the particular content fingerprint based, at least in part, on a result of the comparing; and
    identifying a user associated with the earliest use.

20. A computer-program product comprising a non-transitory computer-usable medium having computer-readable program code embodied therein, the computer-readable program code adapted to be executed to implement a method comprising:
    identifying a user-initiated precursor of an anticipated exposure event;
    in response to the identifying, automatically determining particular content that would be exposed if the anticipated exposure event were to occur;
    automatically determining one or more users to which the particular content would be exposed if the anticipated exposure event were to occur;
    before the anticipated exposure event occurs, publishing a result of the automatically determining one or more users to a user associated with the user-initiated precursor; and
    in response to a detected occurrence of the anticipated exposure event, monitoring a plurality of communications platforms for follow-on exposure events in relation to the particular content which chain from the detected occurrence of the anticipated exposure event.

* * * * *